United States Patent
Pelletier et al.

(10) Patent No.: US 12,167,316 B2
(45) Date of Patent: *Dec. 10, 2024

(54) METHODS AND APPARATUS FOR RADIO RESOURCES MANAGEMENT IN MULTI-RADIO ACCESS TECHNOLOGY WIRELESS SYSTEMS

(71) Applicant: INTERDIGITAL PATENT HOLDINGS, INC., Wilmington, DE (US)

(72) Inventors: Ghyslain Pelletier, Montreal (CA); Diana Pani, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,660

(22) Filed: Nov. 3, 2023

(65) Prior Publication Data

US 2024/0064608 A1     Feb. 22, 2024

Related U.S. Application Data

(63) Continuation of application No. 17/828,281, filed on May 31, 2022, now Pat. No. 11,838,849, which is a
(Continued)

(51) Int. Cl.
*H04W 40/24* (2009.01)
*H04W 72/0453* (2023.01)
(Continued)

(52) U.S. Cl.
CPC ..... *H04W 40/248* (2013.01); *H04W 72/0453* (2013.01); *H04W 76/15* (2018.02);
(Continued)

(58) Field of Classification Search
CPC ... H04W 40/248; H04W 76/15; H04W 76/16; H04W 76/19; H04W 76/20; H04W 72/0453; H04W 84/042; H04W 88/06
(Continued)

(56) References Cited

U.S. PATENT DOCUMENTS 7,826,411 B2    11/2010  Gonikberg et al.
7,917,113 B2     3/2011  Palenius et al.
(Continued)

FOREIGN PATENT DOCUMENTS

CN    1806455    7/2006
CN    1863344    11/2006
(Continued)

OTHER PUBLICATIONS

"Overview of 3GPP LTE-Advanced Carrier Aggregation for 4G Wireless Communications," IEEE Communications Magazine, vol. 50, No. 2 (Feb. 1, 2012), 9 pages.
(Continued)

*Primary Examiner* — Gbemileke J Onamuti
(74) *Attorney, Agent, or Firm* — Volpe Koenig

(57) ABSTRACT

Methods and apparatus for performing wireless communication in a wireless transmit/receive unit (WTRU) configured for multi-radio access technology (RAT) operation are disclosed. A method includes the WTRU wirelessly communicating information on a first operating frequency according to a first RAT. The WTRU also wirelessly communicates information on a second operating frequency according to a second RAT.

14 Claims, 8 Drawing Sheets

Related U.S. Application Data continuation of application No. 17/063,154, filed on Oct. 5, 2020, now Pat. No. 11,350,341, which is a continuation of application No. 16/523,577, filed on Jul. 26, 2019, now Pat. No. 10,798,637, which is a continuation of application No. 16/034,000, filed on Jul. 12, 2018, now Pat. No. 10,412,660, which is a continuation of application No. 15/785,044, filed on Oct. 16, 2017, now Pat. No. 10,028,200, which is a continuation of application No. 15/193,693, filed on Jun. 27, 2016, now abandoned, which is a continuation of application No. 14/673,000, filed on Mar. 30, 2015, now Pat. No. 9,380,628, which is a continuation of application No. 13/557,853, filed on Jul. 25, 2012, now Pat. No. 8,995,370.

(60) Provisional application No. 61/513,180, filed on Jul. 29, 2011.

(51) Int. Cl.

| | | |
|---|---|---|
| *H04W 76/15* | (2018.01) | |
| *H04W 76/16* | (2018.01) | |
| *H04W 76/20* | (2018.01) | |
| *H04W 88/06* | (2009.01) | |
| *H04W 76/19* | (2018.01) | |
| *H04W 84/04* | (2009.01) | |

(52) U.S. Cl.
CPC ........... *H04W 76/16* (2018.02); *H04W 76/20* (2018.02); *H04W 88/06* (2013.01); *H04W 76/19* (2018.02); *H04W 84/042* (2013.01)

(58) Field of Classification Search
USPC ........................................................ 455/424
See application file for complete search history.

(56) References Cited

U.S. PATENT DOCUMENTS

| | | |
|---|---|---|
| 7,978,677 B2 | 7/2011 | Prakash et al. |
| 8,184,658 B1 | 5/2012 | Chowdhuri et al. |
| 8,195,991 B2 | 6/2012 | Kitazoe |
| 8,228,947 B2 | 7/2012 | Pirskanen et al. |
| 8,248,996 B2 | 8/2012 | Li et al. |
| 8,285,284 B2 | 10/2012 | Koyanagi et al. |
| 8,364,199 B2 | 1/2013 | Xue et al. |
| 8,369,290 B2 | 2/2013 | Xing et al. |
| 8,498,284 B2 | 7/2013 | Pani et al. |
| 8,553,580 B2 | 10/2013 | Yin |
| 8,644,286 B2 | 2/2014 | Sollenberger et al. |
| 9,008,671 B2 | 4/2015 | Fodor et al. |
| 9,113,450 B2 | 8/2015 | Pelletier et al. |
| 9,185,580 B2 | 11/2015 | Jung et al. |
| 9,344,229 B2 | 5/2016 | Huang |
| 9,392,515 B2 | 7/2016 | Wang et al. |
| 9,882,821 B2 | 1/2018 | Bi et al. |
| 10,341,910 B2 | 7/2019 | Burbidge et al. |
| 2005/0202823 A1 | 9/2005 | Shaheen et al. |
| 2006/0056448 A1 | 3/2006 | Zaki et al. |
| 2006/0121877 A1 | 6/2006 | Raghuram et al. |
| 2006/0121921 A1 | 6/2006 | Tajima et al. |
| 2007/0116012 A1 | 5/2007 | Chang et al. |
| 2007/0201397 A1 | 8/2007 | Zhang |
| 2007/0232358 A1 | 10/2007 | Sherman |
| 2007/0265875 A1 | 11/2007 | Jiang et al. |
| 2007/0286126 A1 | 12/2007 | Prakash et al. |
| 2008/0089285 A1 | 4/2008 | Pirskanen et al. |
| 2008/0171561 A1 | 7/2008 | Irony et al. |
| 2008/0220787 A1 | 9/2008 | Stanwood et al. |
| 2008/0305799 A1 | 12/2008 | Zuniga et al. |
| 2009/0016302 A1 | 1/2009 | Shaheen |
| 2009/0103496 A1 | 4/2009 | Purkayastha et al. |
| 2009/0122730 A1 | 5/2009 | Yang et al. |
| 2009/0137265 A1 | 5/2009 | Flore et al. |
| 2009/0149189 A1 | 6/2009 | Sammour et al. |
| 2009/0175214 A1 | 7/2009 | Sfar et al. |
| 2009/0180451 A1 | 7/2009 | Alpert et al. |
| 2009/0196259 A1 | 8/2009 | Pani et al. |
| 2009/0232067 A1 | 9/2009 | Pajukoski et al. |
| 2009/0238124 A1 | 9/2009 | Pragada et al. |
| 2009/0247163 A1 | 10/2009 | Aoyama |
| 2009/0275325 A1 | 11/2009 | Davis |
| 2009/0310579 A1 | 12/2009 | Furuta |
| 2009/0316659 A1 | 12/2009 | Lindoff et al. |
| 2010/0020852 A1 | 1/2010 | Erell et al. |
| 2010/0027471 A1 | 2/2010 | Palanki et al. |
| 2010/0039988 A1 | 2/2010 | Narasimha et al. |
| 2010/0075698 A1 | 3/2010 | Rune et al. |
| 2010/0098012 A1 | 4/2010 | Bala et al. |
| 2010/0124291 A1 | 5/2010 | Muharemovic et al. |
| 2010/0130205 A1 | 5/2010 | Jung et al. |
| 2010/0157895 A1 | 6/2010 | Pani et al. |
| 2010/0157923 A1 | 6/2010 | Jung et al. |
| 2010/0157944 A1 | 6/2010 | Horn |
| 2010/0159919 A1 | 6/2010 | Wu |
| 2010/0202392 A1 | 8/2010 | Zhang et al. |
| 2010/0202394 A1 | 8/2010 | Zhang et al. |
| 2010/0240372 A1 | 9/2010 | Wu |
| 2010/0240375 A1 | 9/2010 | Ahluwalia |
| 2010/0260111 A1 | 10/2010 | Sung et al. |
| 2010/0260147 A1 | 10/2010 | Xing et al. |
| 2010/0273520 A1 | 10/2010 | Pelletier et al. |
| 2010/0296473 A1 | 11/2010 | Kim et al. |
| 2011/0021154 A1 | 1/2011 | Marinier et al. |
| 2011/0038271 A1 | 2/2011 | Shin et al. |
| 2011/0044218 A1 | 2/2011 | Kaur et al. |
| 2011/0044297 A1 | 2/2011 | Lee et al. |
| 2011/0051660 A1 | 3/2011 | Arora et al. |
| 2011/0075605 A1 | 3/2011 | De Pasquale et al. |
| 2011/0105173 A1 | 5/2011 | Haim et al. |
| 2011/0134774 A1 | 6/2011 | Pelletier et al. |
| 2011/0134831 A1 | 6/2011 | Pirskanen |
| 2011/0141959 A1 | 6/2011 | Damnjanovic et al. |
| 2011/0275374 A1 | 11/2011 | Narasimha et al. |
| 2011/0281615 A1 | 11/2011 | Yamada et al. |
| 2011/0300856 A1 | 12/2011 | Aminaka |
| 2011/0310859 A1 | 12/2011 | Vedantham et al. |
| 2012/0039471 A1 | 2/2012 | Kim et al. |
| 2012/0044880 A1 | 2/2012 | Sun et al. |
| 2012/0064886 A1 | 3/2012 | Kim et al. |
| 2012/0064936 A1 | 3/2012 | Vrzic et al. |
| 2012/0082107 A1 | 4/2012 | Ou et al. |
| 2012/0083308 A1 | 5/2012 | Wang et al. |
| 2012/0113839 A1 | 5/2012 | Etemad |
| 2012/0120821 A1 | 5/2012 | Kazmi et al. |
| 2012/0140743 A1 | 6/2012 | Pelletier et al. |
| 2012/0178454 A1 | 7/2012 | Kim et al. |
| 2012/0281548 A1 | 11/2012 | Lin et al. |
| 2012/0287902 A1 | 11/2012 | Bufe et al. |
| 2013/0010619 A1 | 1/2013 | Fong et al. |
| 2013/0028069 A1 | 1/2013 | Pelletier et al. |
| 2013/0083678 A1 | 4/2013 | Yin |
| 2013/0165130 A1 | 6/2013 | Wu et al. |
| 2013/0176988 A1 | 7/2013 | Wang et al. |
| 2013/0242898 A1 | 9/2013 | Johansson et al. |
| 2013/0294414 A1 | 11/2013 | Inumaru |
| 2013/0315092 A1 | 11/2013 | Yu et al. |
| 2014/0010207 A1 | 1/2014 | Horn et al. |
| 2014/0038590 A1 | 2/2014 | Witjing et al. |
| 2014/0056278 A1 | 2/2014 | Marinier et al. |
| 2014/0080484 A1 | 3/2014 | Centonza et al. |
| 2014/0099939 A1 | 4/2014 | Uemura et al. |
| 2014/0112155 A1 | 4/2014 | Lindoff et al. |
| 2014/0254468 A1 | 9/2014 | Raaf et al. |
| 2015/0009853 A1 | 1/2015 | Wan et al. |
| 2015/0072689 A1 | 3/2015 | Wu |
| 2015/0215898 A1 | 7/2015 | Nebat et al. |
| 2016/0066364 A1 | 3/2016 | Marinier et al. |
| 2016/0323790 A1 | 11/2016 | Wang et al. |
| 2017/0265176 A1 | 9/2017 | Marinier et al. |

(56) References Cited

U.S. PATENT DOCUMENTS

FOREIGN PATENT DOCUMENTS

| | | |
|---|---|---|
| CN | 1878392 | 12/2006 |
| CN | 101061740 | 10/2007 |
| CN | 101111062 | 1/2008 |
| CN | 101553999 | 10/2009 |
| CN | 201352855 Y | 11/2009 |
| CN | 101867878 | 10/2010 |
| CN | 101933362 | 12/2010 |
| CN | 101959171 | 1/2011 |
| CN | 102131261 | 7/2011 |
| CN | 201893939 | 7/2011 |
| CN | 102238716 | 11/2011 |
| CN | 102301801 | 12/2011 |
| CN | 102308544 | 1/2012 |
| CN | 102308640 | 1/2012 |
| CN | 102461045 | 5/2012 |
| CN | 102577541 | 7/2012 |
| CN | 102149179 | 8/2013 |
| EP | 2242300 | 10/2010 |
| EP | 2341679 | 7/2011 |
| EP | 2582076 | 4/2013 |
| EP | 2603038 | 6/2013 |
| EP | 3319395 | 5/2018 |
| JP | 2004007279 | 1/2004 |
| JP | 2005-269109 | 9/2005 |
| JP | 2008508832 | 3/2008 |
| JP | 2009077287 | 4/2009 |
| JP | 2009124500 | 6/2009 |
| JP | 2009231976 | 10/2009 |
| JP | 2009290341 | 12/2009 |
| JP | 2009303030 | 12/2009 |
| JP | 2010220214 | 9/2010 |
| JP | 2011517536 | 6/2011 |
| JP | 2011525327 A | 9/2011 |
| JP | 2011530238 | 12/2011 |
| JP | 2012503347 | 2/2012 |
| JP | 2012525030 | 10/2012 |
| JP | 2012528538 | 11/2012 |
| JP | 2013502152 | 1/2013 |
| JP | 2014523966 | 9/2014 |
| JP | 2015139570 A | 8/2015 |
| JP | 2017121488 | 7/2017 |
| JP | 2019113875 | 7/2019 |
| KR | 20070041096 | 4/2007 |
| KR | 20100071775 | 6/2010 |
| KR | 20110050546 | 5/2011 |
| KR | 20110124302 | 11/2011 |
| KR | 20110125244 | 11/2011 |
| KR | 20120027526 | 3/2012 |
| KR | 101925764 | 12/2018 |
| RU | 2008148124 | 6/2010 |
| RU | 2420903 | 6/2011 |
| TW | 201008315 | 2/2010 |
| WO | 2005002141 | 1/2005 |
| WO | 2006019237 | 2/2006 |
| WO | 2009009560 | 1/2009 |
| WO | 2009120125 | 10/2009 |
| WO | 2010014969 | 2/2010 |
| WO | 2010032675 | 3/2010 |
| WO | 2010033438 | 3/2010 |
| WO | 2010044632 | 4/2010 |
| WO | 2010073830 | 7/2010 |
| WO | 2010080848 | 7/2010 |
| WO | 2010103725 | 9/2010 |
| WO | 2010105145 | 9/2010 |
| WO | 2010105148 | 9/2010 |
| WO | 2010121708 | 10/2010 |
| WO | 2010138634 | 12/2010 |
| WO | 2010144601 | 12/2010 |
| WO | 2010144864 | 12/2010 |
| WO | 2011019501 | 2/2011 |
| WO | 2011067459 | 6/2011 |
| WO | 2011100492 | 8/2011 |
| WO | 2011100673 | 8/2011 |
| WO | 2011120716 | 10/2011 |
| WO | 2011137775 | 11/2011 |
| WO | 2011159311 | 12/2011 |
| WO | 2012074878 | 7/2012 |
| WO | 2012096502 | 7/2012 |
| WO | 2012101688 | 8/2012 |

OTHER PUBLICATIONS

Alcatel Shanghai Bell et al., "Relaying for LTE-Advanced," 3GPP TSG RAN WG1 Meeting #55bis R1-090066, Ljubljana, Slovenia (Jan. 12-16, 2009).

Alcatel-Lucent et al., "Proximity Indication after handover and re-establishment," 3GPP TSG-RAN WG2 Meeting #69, San Francisco, US (Feb. 22-26, 2010).

Alcatel-Lucent et al., "Simultaneous transmissions of multiple UL channels with multiple TA groups," 3GPP TSG RAN WG1 Meeting #69, R1-122473, Prague, Czech Republic (May 21-25, 2012).

Dimou et al., "Generic Link Layer: A Solution for Multi-Radio Transmission Diversity in Communication Networks Beyond 3G," IEEE, 2005, 5 pages.

English language abstract, Japanese Publication No. 2004-007279, Jan. 8, 2004, 2 pages.

English language abstract, Japanese Publication No. JP 2009077287 A, 1 page (Apr. 9, 2009).

English language abstract, Korean Publication No. KR 20100071775A, dated Jan. 22, 2021, 1 page.

Ericsson et al., "Spectrum Migration From HSPA to LTE," R1-111089, 3GPP TSG-RAN WG1 Meeting #64, Taipei, Taiwan, Feb. 21-25, 2011.

Ericsson, "Control plane aspects of carrier aggregation," 3GPP TSG-RAN WG2 #66, R2-092958, San Francisco, USA (May 4-8, 2009).

Ericsson, "Impact of Carrier Aggregation on the L2 Protocol Architecture for LTE Rel-10," R2-092957, 3GPP TSG-RAN WG2 #66, San Francisco, USA, May 4-8, 2009.

Ericsson, "RNL-based energy saving solution," 3GPP TSG-RAN3 Meeting #66, R3-093104, Jeju, Korea (Nov. 9-13, 2009).

Huawei et al., "Migration Scenarios and Possible Aggregation Between HSPA and LTE," R1-111126, 3GPP TSG RAN WG1 #64, Taipei, Taiwan, Feb. 21-25, 2011.

Huawei, "Carrier aggregation in active mode," 3GPP TSG-RAN WG2 Meeting #66, R2-093104, San Francisco, USA (May 4-8, 2009).

Huawei, "Mobility Management Consideration for Carrier Aggregation," 3GPP TSG-RAN WG2 Meeting #66bis, R2-093933, Los Angeles, USA (Jun. 29-Jul. 3, 2009).

IEEE 802.16e-2005, IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands, and Corrigendum 1 (Feb. 28, 2006).

IEEE Std 802.11a-1999 (R2003) (Supplement to IEEE SID 802.11-1999), Supplement to IEEE Standard for Information technology—Telecommunications and information exchange between systems—Local and metropolitan area networks—Specific requirements, Part 11: Wireless LAN , Medium Access Control (MAC) and Physical Layer (PHY) specifications High-speed Physical Layer in the 5 GHz Band (Jun. 12, 2003).

IEEE Std 802.11b-1999 (R2003) (Supplement to ANSI/IEEE Std 802.11, 1999 Edition), Supplement to IEEE Standard for Information technology—Telecommunications and information exchange between systems—Local and metropolitan area networks—Specific requirements, Part 11: Wireless LAN Medium Access Control (MAC) and Physical Layer (PHV) specifications: Higher-Speed Physical Layer Extension in the 2.4 GHz Band (Jun. 12, 2003).

IEEE Std 802.11g (2003) (Amendment to IEEE Std 802.11, 1999 Edition (Reaff 2003)), IEEE Standard for Information technology—Telecommunications and information exchange between systems—Local and metropolitan area networks—Specific requirements, Part 11: Wireless LAN Medium Access Control (MAC) and Physical

(56) References Cited

OTHER PUBLICATIONS

Layer (PHY) specifications, Amendment 4: Further Higher Data Rate Extension in the 2.4 GHz Band (Jun. 27, 2003).
IEEE Std 802.16a-2003, IEEE Standard for Local and metropolitan area networks, Part 16: Air Interface for Fixed Broadband Wireless Access Systems—Amendment 2: Medium Access Control Modifications and Additional Physical Layer Specifications for 2-11 GHZ (Apr. 1, 2003).
IEEE Std 802.20-2008, IEEE Standard for Local and metropolitan area networks, Part 20: Air Interface for Mobile Broadband Wireless Access Systems Supporting Vehicular Mobility—Physical and Media Access Control Layer Specification (Aug. 29, 2008).
IEEE Std. 802.11n-2009, IEEE Standard for Information technology-Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput (Sep. 11, 2009).
Lai et al., "Preliminary Study on Radio Resource Management (RRM) Testing for TD-SCDMA Terminals," Telecommunications Network Technology, No. 6 (Jun. 15, 2006).
LG Electronics et al., "WID for Operator Policies for IP Interface Selection (OPIIS)," TD S2-110668, 3GPP TSG SA WG2 Meeting #83, Salt Lake City, Utah, USA, Feb. 21-25, 2011.
Motorola et al., "Enhanced 1xCS Fallback support for dual Rx/Tx devices," 3GPP TSG SA WG2 Meeting #80, TD S2-103616, Brunstad, Norway (Aug. 30-Sep. 3, 2010).
Nokia Siemens Networks (Rapporteur), "Stage 2 description of Carrier Aggregation," 3GPP TSG-RAN WG2 Meeting #69, R2-101985, R2-101985 (Apr. 12-16, 2010).
Nokia Siemens Networks et al., "Aggregating HSDPA and LTE carriers," 3GPP TSG-RAN WG2 Meeting #74, R2-113245, Barcelona, Spain (May 9-13, 2011).
Nokia Siemens Networks et al., "Aggregating HSDPA and LTE Carriers," R1-111060, 3GPP TSG-RAN WG1 Meeting #64, Taipei, Taiwan, Feb. 21-25, 2011.
Nokia Siemens Networks et al., "Aggregating HSDPA and LTE carriers," 3GPP TSG-RAN WG2 Meeting #74, R2-113245 (May 9-13, 2011).
Nokia Siemens Networks et al., "UL transmissions in case of multiple TA," 3GPP TSG-RAN WG1 Meeting #69, R1-122402, Prague, Czech Republic (May 21-25, 2012).
Panasonic, "LTE-advanced discussion for RAN2," 3GPP TSG RAN WG2 #65bis, R2-092394, Seoul, Korea (Mar. 23-27, 2009).
Qualcomm Europe, "Carrier Aggregation in Heterogeneous Networks," 3GPP TSG RAN WG1 #55bis, R1-090357, Ljubljana, Slovenia (Jan. 12-16, 2009).
Qualcomm Incorporated, "Definition of Pcmax, c," 3GPP TSG RAN4 #57AH, R4-110207, Austin, Texas, USA (Jan. 17-21, 2010).
RAN2, "LS on RAN2 status on carrier aggregation design," 3GPP TSG-RAN WG2 meeting #66, R2-093599 San Francisco, US (May 4-8, 2009).
Samsung, "Miscellaneous small clarifications and corrections," 3GPP TSG-RAN2 Meeting #73, R2-110813, Taipei, Taiwan (Feb. 21-25, 2011).
Texas Instruments, "Physical layer aspects of multiple timing advance commands," 3GPP TSG RAN WG1 #68, R1-120462, Dresden, Germany (Feb. 6-10, 2012).
Third Generation Partnership Project, "Technical Specification Group Radio Access Network; Evolved Universal Terrestrial Radio Access (E-UTRA); Medium Access Control (MAC) Protocol Specification (Release 10)," 3GPP TS 36.321 v10.2.0, Jun. 2011.
Third Generation Partnership Project, "Technical Specification Group Radio Access Network; Evolved Universal Terrestrial Radio Access (E-UTRA); Medium Access Control (MAC) Protocol Specification (Release 10)," 3GPP TS 36.321 v10.5.0, Mar. 2012.
Third Generation Partnership Project, "Technical Specification Group Radio Access Network; Evolved Universal Terrestrial Radio Access (E-UTRA); Multiplexing and Channel Coding (Release 10)," 3GPP TS 36.212 v10.2.0, Jun. 2011.
Third Generation Partnership Project, "Technical Specification Group Radio Access Network; Evolved Universal Terrestrial Radio Access (E-UTRA); Multiplexing and Channel Coding (Release 10)," 3GPP TS 36.212 v10.6.0, Jun. 2012.
Third Generation Partnership Project, "Technical Specification Group Radio Access Network; Evolved Universal Terrestrial Radio Access (E-UTRA); Physical Layer Procedures (Release 10)," 3GPP TS 36.213 v10.2.0, Jun. 2011.
Third Generation Partnership Project, "Technical Specification Group Radio Access Network; Evolved Universal Terrestrial Radio Access (E-UTRA); Physical Layer Procedures (Release 10)," 3GPP TS 36.213 v10.6.0, Jun. 2012.
Third Generation Partnership Project, "Technical Specification Group Radio Access Network; Evolved Universal Terrestrial Radio Access (E-UTRA); Radio Resource Control (RRC); Protocol Specification (Release 10)," 3GPP TS 36.331 v10.2.0, Jun. 2011.
Third Generation Partnership Project, "Technical Specification Group Radio Access Network; Evolved Universal Terrestrial Radio Access (E-UTRA); Radio Resource Control (RRC); Protocol Specification (Release 10)," 3GPP TS 36.331 v10.6.0, Jul. 2012.
Third Generation Partnership Project, "Technical Specification Group Radio Access Network; Radio Resource Control (RRC); Protocol Specification (Release 10)," 3GPP TS 25.331 v10.4.0, Jun. 2011.
Third Generation Partnership Project, "Technical Specification Group Radio Access Network; Radio Resource Control (RRC); Protocol Specification (Release 10)," 3GPP TS 25.331 v10.8.0, Jul. 2012.
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.0.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.7.0 (Jun. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.11.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.14.0 (Jun. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.17.0 (Jun. 2012).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).
Third Generation Partnership Project, "Technical Specification Group Radio Access Network; Evolved Universal Terrestrial Radio Access

(56) References Cited

OTHER PUBLICATIONS (E-UTRA); Medium Access Control (MAC) protocol specification (Release 9)," 3GPP TS 36.321 V9.3.0 (Jun. 2010).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC); Protocol Specification (Release 4)," 3GPP TS 25.331 V4.20.0 (Dec. 2008).
Third Generation Partnership Project, "Technical Specification Group Radio Access Network; Radio Resource Control (RRC); Protocol Specification (Release 5)," 3GPP TS 25.331 V5.24.0 (Jun. 2009).
Third Generation Partnership Project, "Technical Specification Group Radio Access Network; Radio Resource Control (RRC); Protocol Specification (Release 6)," 3GPP TS 25.331 V6.25.0 (Mar. 2010).
Third Generation Partnership Project, "Technical Specification Group Radio Access Network; Radio Resource Control (RRC); Protocol Specification (Release 4)," 3GPP TS 25.331 v4.21.0, Jan. 2012.
Third Generation Partnership Project, "Technical Specification Group Radio Access Network; Radio Resource Control (RRC); Protocol Specification (Release 5)," 3GPP TS 25.331 v5.25.0, Jan. 2012.
Third Generation Partnership Project, "Technical Specification Group Radio Access Network; Radio Resource Control (RRC); Protocol Specification (Release 6)," 3GPP TS 25.331 v6.26.0, Jan. 2012.
Third Generation Partnership Project, "Technical Specification Group Radio Access Network; Radio Resource Control (RRC); Protocol Specification (Release 7)," 3GPP TS 25.331 v7.20.0, Jun. 2011.
Third Generation Partnership Project, "Technical Specification Group Radio Access Network; Radio Resource Control (RRC); Protocol Specification (Release 7)," 3GPP TS 25.331 v7.22.0, Mar. 2012.
Third Generation Partnership Project, "Technical Specification Group Radio Access Network; Radio Resource Control (RRC); Protocol Specification (Release 8)," 3GPP TS 25.331 v8.15.0, Jun. 2011.
Third Generation Partnership Project, "Technical Specification Group Radio Access Network; Radio Resource Control (RRC); Protocol Specification (Release 8)," 3GPP TS 25.331 v8.19.0, Jul. 2012.
Third Generation Partnership Project, "Technical Specification Group Radio Access Network; Radio Resource Control (RRC); Protocol Specification (Release 9)," 3GPP TS 25.331 v9.7.0, Jul. 2011.
Third Generation Partnership Project, "Technical Specification Group Radio Access Network; Radio Resource Control (RRC); Protocol Specification (Release 9)," 3GPP TS 25.331 v9.11.0, Jul. 2012.
Third Generation Partnership Project, "Technical Specification Group Radio Access Network; Radio Resource Control (RRC); Protocol Specification (Release 11)," 3GPP TS 25.331 v11.2.0, Jul. 2012.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.4.0 (Jun. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.8.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.2.0 (Jun. 2012).
Third Generation Partnership Project, "Technical Specification Group Services and System Aspects; Circuit Switched (CS) fallback in Evolved Packet System (EPS); Stage 2 (Release 10)," 3GPP TS 23.272 V10.4.0 (Jun. 2011).
Third Generation Partnership Project, "Technical Specification Group Services and System Aspects; Circuit Switched (CS) fallback in Evolved Packet System (EPS); Stage 2 (Release 11)," 3GPP TS 23.272 V11.1.0 (Jun. 2012).
Third Generation Partnership Project, "Technical Specification Group Radio Access Network; Evolved Universal Terrestrial Radio Access (E-UTRA); Physical layer procedures (Release 10)," 3GPP TS 36.213 V10.1.0 (Mar. 2011).
Third Generation Partnership Project, "Technical Specification Group Radio Access Network; Evolved Universal Terrestrial Radio Access (E-UTRA); Physical layer procedures (Release 10)," 3GPP TS 36.213 V10.0.1 (Dec. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.0.0 (Dec. 2010).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.0.0 (Dec. 2010).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.1.0 (Mar. 2011).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.0.0 (Dec. 2010).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.2.0 (Mar. 2013).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.1.0 (Mar. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.5.0 (Dec. 2010).
Third Generation Partnership Project, "Technical Specification Group Radio Access Network; Radio Resource Control (RRC); Protocol specification (Release 10)," 3GPP TS 25.331 V10.2.0 (Dec. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.2.0 (Jun. 2011).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.5.0 (Jun. 2012).
Third Generation Partnership Project, "Technical Specification Group Radio Access Network; Evolved Universal Terrestrial Radio Access

(56) References Cited

OTHER PUBLICATIONS (E-UTRA); Radio Link Control (RLC) protocol specification (Release 10)," 3GPP TS 36.322 V10.0.0 (Dec. 2010).
Third Generation Partnership Project, "Technical Specification Group Radio Access Network; Evolved Universal Terrestrial Radio Access Network (E-UTRAN); X2 application protocol (X2AP) (Release 10)," 3GPP TS 36.423 V10.5.0 (Mar. 2012).
Third Generation Partnership Project, "Technical Specification Group Radio Access Network; Evolved Universal Terrestrial Radio Access Network (E-UTRAN); X2 application protocol (X2AP) (Release 10)," 3GPP TS 36.423 V10.2.0 (Jun. 2011).
Third Generation Partnership Project, "Technical Specification Group Radio Access Network; Evolved Universal Terrestrial Radio Access Network (E-UTRAN); X2 application protocol (X2AP) (Release 11)," 3GPP TS 36.423 V11.1.0 (Jun. 2012).
ZTE, "Consideration on the Aggregation of LTE and HSPA," R1-111173, 3GPP TSG-RAN WG1 Meeting #64, Taipei, Taiwan, Feb. 21-25, 2011.
Chinese Office Action (English Translation), Chinese Application No. 201180058295.2, Nov. 17, 2015, 11 pages.
Chinese Office Action, Chinese Application No. 201180058295.2, Nov. 17, 2015, 8 pages.
English Language Abstract, JP 2010-220214, Sep. 30, 2010, 2 pages.
International Search Report and Written Opinion, International Patent Application No. PCT/US2011/062091, Jan. 31, 2012 18 pages.
Japanese Notice of Allowance (English Translation), Japanese Application No. 2013-542065, Jun. 21, 2016, 3 pages.
Japanese Notice of Allowance, Japanese Application No. 2013-542065, Jun. 21, 2016, 3 pages.
Japanese Notice of Rejection (English Translation), Japanese Application No. 2013-542065, Oct. 27, 2015, 5 pages.
Japanese Notice of Rejection, Japanese Application No. 2013-542065, Oct. 27, 2015, 5 pages.
Japanese Official Notice of Rejection (English Translation), Japanese Application No. 2016-143413, Sep. 5, 2017, 6 pages.
Japanese Official Notice of Rejection, Japanese Application No. 2016-143413, Sep. 5, 2017, 5 pages.
Korean Office Action (English Translation), Korean Application No. 10-2013-7017409, Mar. 22, 2017, 6 pages.
Korean Office Action, Korean Application No. 10-2013-7017409, Mar. 22, 2017, 6 pages.
Pantech, "Considerations on Multiple TA capability", 3GPP Tdoc R2-122908; 3GPP TSG RAN WG2 Meeting #78, Prague, Czech, May 21-25, 2012, 3 pages.
Taiwanese Examination Notification (English translation), Taiwanese Application No. 105111404, Dec. 20, 2016, 5 pages.
Taiwanese Examination Notification, Taiwanese Application No. 105111404, Dec. 20, 2016, 6 pages.
Third Generation Partnership Project, "Technical Specification Group Radio Access Network; Evolved Universal Terrestrial Radio Access (E-UTRA); Radio Link Control (RLC) protocol specification (Release 8)," 3GPP TS 36.322 V8.6.0 (Jun. 2009).
Third Generation Partnership Project, "Technical Specification Group Radio Access Network; Evolved Universal Terrestrial Radio Access Network (E-UTRAN); X2 application protocol (X2AP) (Release 8)," 3GPP TS 36.423 V8.6.0 (Jun. 2009).
United States Office Action, U.S. Appl. No. 14/936,018, filed Jun. 6, 2017, 21 pages.

METHODS AND APPARATUS FOR RADIO RESOURCES MANAGEMENT IN MULTI-RADIO ACCESS TECHNOLOGY WIRELESS SYSTEMS

CROSS REFERENCE TO RELATED APPLICATIONS

This application is a continuation of U.S. patent application Ser. No. 17/828,281 filed on May 31, 2022 which is a continuation of U.S. patent application Ser. No. 17/063,154, filed on Oct. 5, 2020 now issued as U.S. Pat. No. 11,350,341 on May 31, 2022, which is a continuation of U.S. patent application Ser. No. 16/523,577, filed Jul. 26, 2019, and issued as U.S. Pat. No. 10,798,637 on Oct. 6, 2020, which is a continuation of U.S. patent application Ser. No. 16/034,000, filed Jul. 12, 2018, and issued as U.S. Pat. No. 10,412,660 on Sep. 10, 2019, which is a continuation of U.S. patent application Ser. No. 15/785,044, filed Oct. 16, 2017, and issued as U.S. Pat. No. 10,028,200 on Jul. 17, 2018, which is a continuation of U.S. patent application Ser. No. 15/193,693, filed Jun. 27, 2016, which is a continuation of U.S. patent application Ser. No. 14/673,000 filed Mar. 30, 2015, and issued as U.S. Pat. No. 9,380,628 on Jun. 28, 2016, which is a continuation of U.S. patent application Ser. No. 13/557,853 filed Jul. 25, 2012, and issued as U.S. Pat. No. 8,995,370, on Mar. 31, 2015, which claims the benefit of U.S. Provisional Application No. 61/513,180, which was filed on Jul. 29, 2011, all of which are hereby incorporated by reference herein.

BACKGROUND

Demand for improved network coverage, improved capacity and increasing bandwidth for voice and data services in wireless systems has led to continuous development of a number of radio access technologies (RATs). Examples of such RATs include, for example, Global Systems Mobile (GSM), Wideband Channel Division Multiple Access (WCDMA), High-Speed Packet Access (HSPA) (which may include High-Speed Downlink Packet Access (HSDPA) and High-Speed Uplink Packet Access (HSUPA) with their respective multicarrier counterparts), Long Term Evolution (LTE) (which may include support for carrier aggregation in LTE Release 10 and beyond) in the Third Generation Partnership Project (3GPP), IEEE 802.11b/a/g/n, IEEE 802.16a/e, IEEE 802.20, Code Division Multiple Access 2000 1× (CDMA2000 1×) and cdma2000 Evolution-Data Optimized (cdma200 EV-DO) in the Third Generation Partnership Project 2 (3GPP2).

SUMMARY

Methods and apparatus for performing wireless communication in a wireless transmit/receive unit (WTRU) configured for multi-RAT operation are disclosed. A method includes the WTRU wirelessly communicating information on a first operating frequency according to a first RAT and wirelessly communicating information on a second operating frequency according to a second RAT.

BRIEF DESCRIPTION OF THE DRAWINGS

A more detailed understanding may be had from the following description, given by way of example in conjunction with the accompanying drawings wherein.

DETAILED DESCRIPTION

Figure 1A:
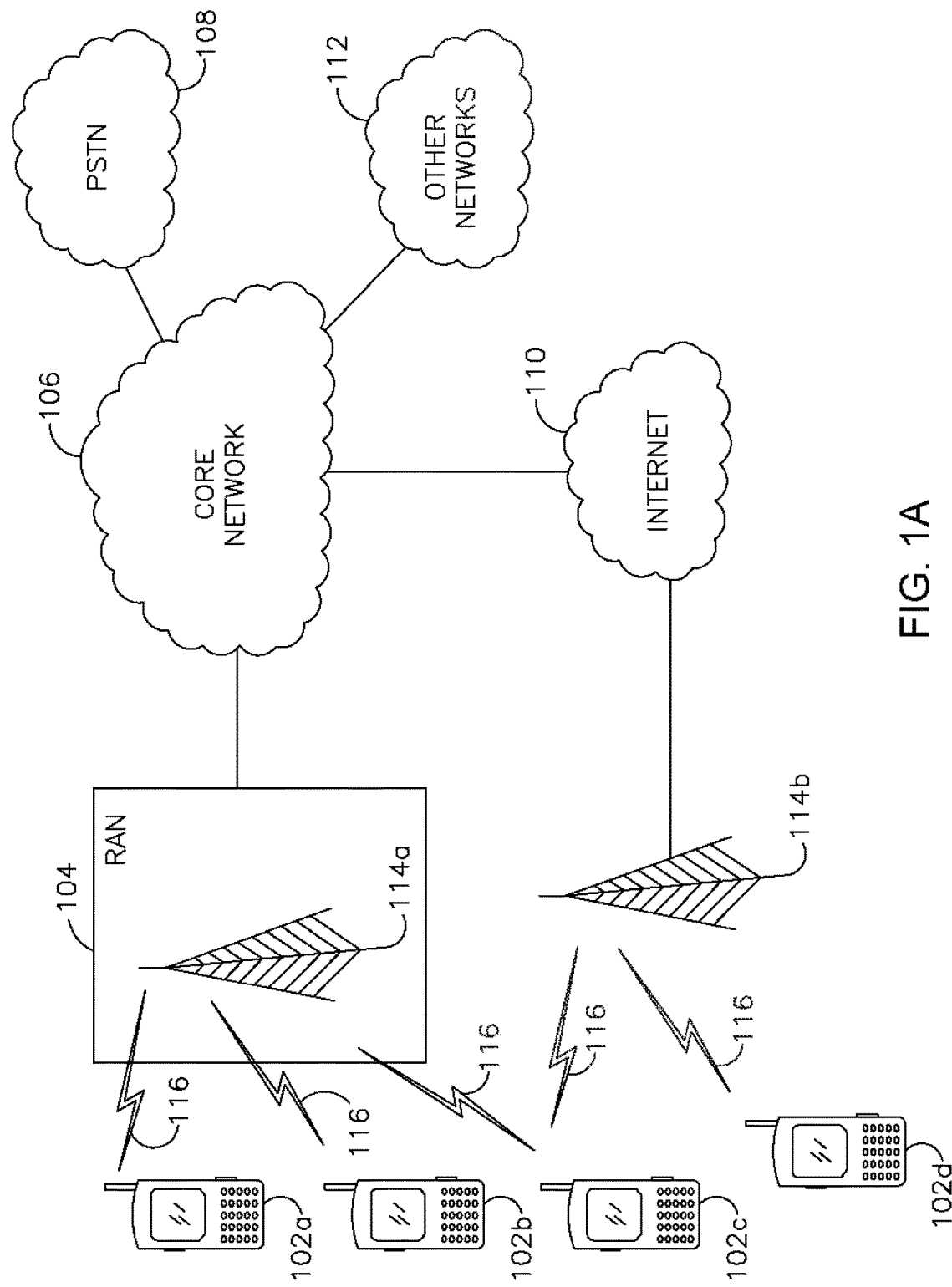
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
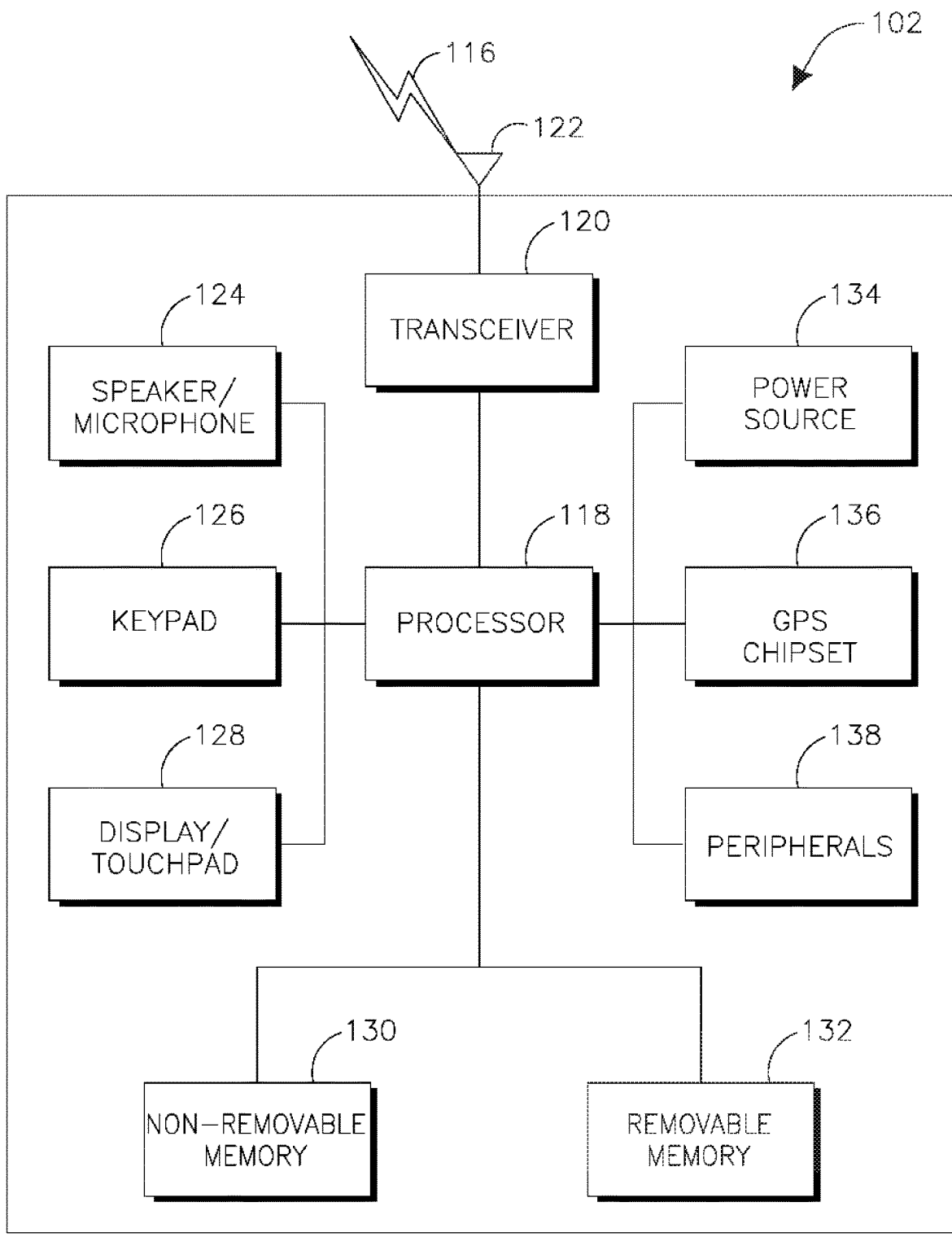
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
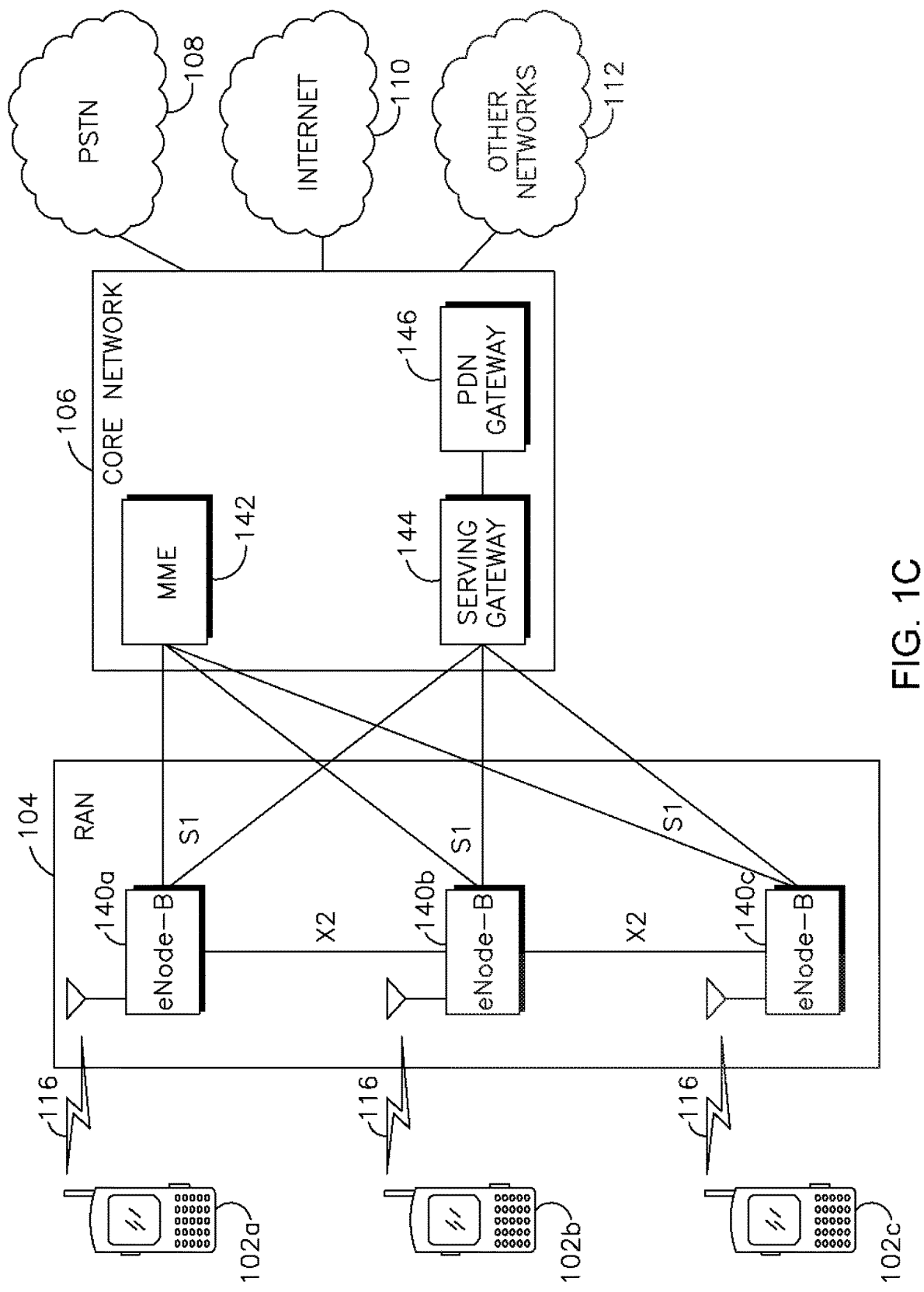
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

As RATs such as WCDMA and LTE have developed, they have been made to enable use of more than one component carrier (CC) for transmissions and receptions between a WTRU and a base station. A CC may be, for example, a frequency on which a WTRU operates. For example, a WTRU may receive transmissions on a downlink (DL) CC, which may comprise a plurality of DL physical channels. For another example, a WTRU may perform transmissions on an uplink (UL) CC, which may comprise a plurality of UL physical channels.

A cell typically minimally includes a DL CC which may be linked to a UL CC based on the SI received by the WTU that is either broadcast on the DL CC or using dedicated configuration signaling from the network. For example, when the SI is broadcast on the DL CC, the WTRU may receive the UL frequency and bandwidth of the linked UL CC as part of the SI IE (e.g., when in RRC IDLE for LTE or when in idle/CELL_FACH for WCDMA (i.e., when the WTRU does not yet have an RRC connection to the network).

More specifically, 3GPP WCDMA Release 8 provided support for simultaneous use of two HSDPA component carriers (2C-HSDPA), Release 9 provided support for MIMO in multicarrier DL WCDMA and also introduced support for two HSUPA UL CCs, and Release 10 introduced support for up to four DL CCs (4C-HSDPA). For Release 11, the number of DL CCs may be increased to eight (8C-HSDPA). 3GPP LTE Release 10 introduced support for simulaneous transmission and/or reception using the radio resources of a plurality of CCs between a base station and a mobile terminal within the same transmission interval. The transmission time interval (TTI) for HSPA is a 2 ms subframe, and the TTI for 3GPP LTE Releases 8, 9 and 10 is a 1 ms subframe (each radio frame (10 ms) includes 10 equally sized sub-frames of 1 ms).

Network architectures for different Rats may support different network functionalities at different entities within the architecture. For some RATs, similar functionalities (e.g., MAC functionalities) may be performed by different entities within the same architecture, and architectures for different RATs may include different entities. For example, for UTRAN, the radio resource control (RRC), packet data control protocol (PDCP), radio link control (RLC), medium access control dedicated (MAC-d) and MAC-is sub-layers are located in the radio network controller (RNC), while medium access control high speed (MAC-hs), MAC-i and layer 1 (L1) are located in the Node B. Further, for universal terrestrial radio access network (UTRAN), security (e.g. ciphering), segmentation and reassembly services to MAC, as well as in-order delivery services to PDCP, are provided by the RLC, while MAC ensures ordering between the hybrid automatic repeat request (HARQ) processes for the RLC layer. For evolved UTRAN (eUTRAN), for another example, there is no RNC, and the RRC, PDCP, RLC and MAC layers are all located in the eNodeB (eNB). Security (e.g., ciphering, integrity and authentication) and in-order delivery services (e.g., at handover) are provided by the PDCP, while the RLC provides segmentation, re-segmentation and reassembly services to MAC.

One of the design objectives for LTE release 8 was to allow operators to deploy LTE using the same sites as for legacy WCDMA deployments to reduce deployment and radio planning costs. Accordingly, network operators may deploy both WCDMA/HSPA and LTE in the same coverage areas, LTE deployments may have similar coverage as existing WCDMA/HSPA deployments and multi-mode WTRUs supporting both WCDMA/HSPA and LTE accesses may be widely deployed.

However, spectrum is a costly resource, and not all frequency bands may be available to all operators. Thus, while it is expected that operators may offer support for both HSPA and LTE services, carrier aggregation scenarios may be limited to at most 2-3 component carriers per RAT for a given operator. In addition, legacy deployments may be maintained for the foreseeable future while LTE is being deployed, which may lead to a situation where operators see periods of underutilization of radio resources/spectrum and capacity in one of their RATs.

HSPA Release 10 with MIMO offers downlink peak data rates of 42 Mbps, and Release 10 multicarrier HSPA may further increase the peak rate by introducing support for up to four DL CCs. LTE Releases 8 and 9 offer up to 100 Mbps in the single CC DL, and LTE Release 10 with intra-RAT carrier aggregation may further increase the peak rate by combining transmission resources of up to 5 CCs. Some motivations for taking advantage of the combined data rates/capacity of the multi-RAT deployment may include, for example, reducing the cost of offering higher data rates (data enhancement scenario), migrating from WCDMA/HSPA to LTE with limited spectrum available (migration scenario), maximizing usage of deployed RATs (e.g., through load balancing), and maximizing usage of radio components in the WTRU (e.g., dual-band receiver).

In addition to capitalizing on increased peak rates, an operator may want to reserve a frequency band for other reasons (e.g., for home eNB deployment). Further, combining HSPA resources with LTE resources may additionally provide means for ensuring service continuity (e.g., either for circuit switched (CS) Voice and/or for services requiring LTE data rates). Accordingly, it may be desirable to have methods allowing a WTRU to operate simultaneously on multiple frequencies, where the WTRU operates on at least one of the frequencies according to a different RAT.

Embodiments described herein may relate to multi-mode WTRUs supporting simultaneous (or near-simultaneous) operation on CCs of a plurality of different RATs. Embodiments described herein may also relate to how multi-mode WTRUs may perform radio resource management and related RRC procedures when using different RATs. In an embodiment, the WTRUs may perform radio resource management and related RRC procedures using different RATs on different frequencies.

Some embodiments described herein are described with respect to the first RAT being LTE and the second RAT being WCDMA, HSUPA and/or HSDPA, and vice versa. However, the embodiments described herein may be applicable to any wireless technology. Further, while not explicitly described herein, embodiments described herein may be applicable to WTRUs that transmit using different RATs only in different time intervals (i.e., some form of time division operation on a TTI basis) on different frequencies and/or where such transmissions are performed in the same frequency band.

Figure 2:
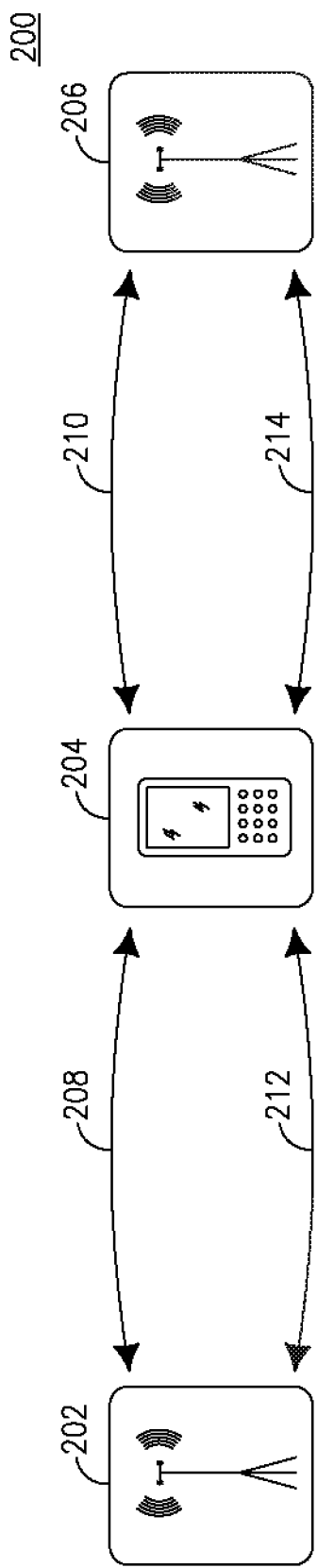
FIG. 2 is a block diagram of an example system for multi-RAT communication.

FIG. 2 is a block diagram of an example system 200 for multi-RAT communication. The illustrated system 200 includes a WTRU 204 and two base stations (e.g., eNBs) 202 and 206. In FIG. 2, one WTRU 204 is in communication with two base stations 202 and 206 using channels 208, 210, 212 and 214. The channels 208, 210, 212 and 214 may be any combination of UL and DL channels of any number of different RATs.

A multi-RAT operation may include any multi-mode WTRU simultaneously configured for operation with at least one CC of a first RAT (e.g., a DL CC, a UL CC, or one or more serving cell(s)) and with at least one CC of a second RAT (e.g., a DL CC, a UL CC, or one or more serving cell(s)). The operation on the different CCs may occur either simultaneously, or near-simultaneously in time. Operation according to different RATs may also be used sequentially, for example, on the same CC. A multi-mode WTRU may include any mobile terminal supporting a plurality of RATs, such as, for example, any combination of GSM, WCDMA, HSPA, HSDPA, HSUPA, LTE, IEEE 802.11b/a/g/n, IEEE 802.16a/e, IEEE 802.20, cdma2000 1× and cdma2000 EV-DO.

A serving cell may include, for example, a primary cell (PCell) or a secondary cell (SCell). More specifically, for a WTRU that is not configured with any SCell or that does not support operation on multiple CCs (carrier aggregation), there may be only one serving cell (the PCell). For a WTRU that is configured with at least one SCell, the serving cells may include a set of one or more cells comprising all configured PCell(s) and all configured SCell(s).

In an embodiment, the WTRU 204 may wirelessly communicate information on a first operating frequency according to a first RAT and may wirelessly communicate information on a second operating frequency according to a second RAT. The communications on the first and second operating frequencies may occur over any combination of the channels 208, 210, 212 and 214. For example, the WTRU 204 may wirelessly communicate information on a first operating frequency according to a first RAT (e.g., LTE) over a DL channel 208 (e.g., LTE DL) and may wirelessly communicate information on a second operating frequency according to a second RAT (e.g., WCDMA) over a DL channel 212 (e.g., WCDMA HSDPA). For another example, the WTRU 204 may wireless communicate information on a first operating frequency according to a first RAT (e.g., WCDMA) over a UL channel 212 (e.g., WCDMA HSUPA) and may wirelessly communicate information on a second operating frequency according to a second RAT (e.g., LTE) over a UL channel 214 (e.g., LTE UL).

A WTRU, such as the WTRU 204 illustrated in FIG. 2, may be configured for multi-RAT operation. A WTRU that supports access to a plurality of RATs may access those resources using one of a number of different control plane arrangements and any one of a number of different methods such as, for example, the control planes and methods illustrated and described below with respect to FIGS. 3-8.

Figure 3:
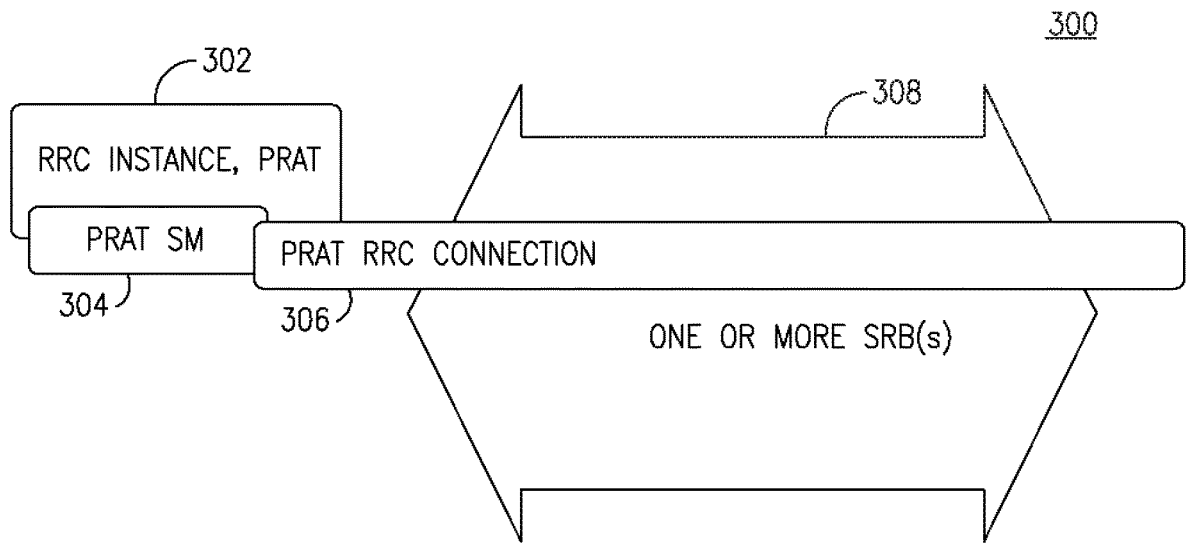
FIG. 3 is a block diagram of an example control plane for multi-RAT operation using a single RRC instance and a single RRC connection per WTRU.

FIG. 3 is a block diagram of an example control plane 300 for multi-RAT operation using a single RRC instance 302, a single state machine 304, a single RRC connection 306 per WTRU, and one or more SRBs 308. When referred to hereafter, the term RRC instance may conceptually represent, without limiting to possible additional aspects or a subset of the following aspects, the use of an RRC protocol that may comprise a single state machine operating using a plurality of RRC states (e.g., CONNECTED or IDLE for the LTE RRC protocol) with corresponding state transitions, RRC procedures (including related timers) including RRC control and measurement procedures, RRC PDUs and information elements (IEs), the RRC configuration (including parameters for configuration of RRC, PDCP, RLC, MAC), and the physical (PHY) layer. In the example illustrated in FIG. 3, the single RRC instance 302 may handle the management of radio resources for all configured RATs.

For HSPA, there are at least four RRC states: CELL_DCH, CELL_FACH, CELL_PCH/URA_PCH and UTRA_IDLE. For LTE, there are at least two RRC states: RRC_CONNECTED and RRC IDLE. The WTRU is in RRC_CONNECTED when an RRC Connection has been established. Otherwise, the WTRU is in RRC IDLE.

In the RRC IDLE state, the WTRU at least monitors the paging channel to detect incoming calls, change of SI, and, in an embodiment, early terrestrial warning system (ETWS)/commercial mobile alert system (CMAS) notifications, and performs neighboring cell measurements, cell selection, cell re-selection, and SI acquisition. In the RRC_CONNECTED state, the WTRU may transmit/receive on unicast channels and at least monitor the paging channel and/or SI Block Type 1 to detect incoming calls, change of SI, and, in an embodiment, ETWS/CMAS notifications. The WTRU may also be configured with one or most secondary cells in addition to the primary cell.

Figure 9:
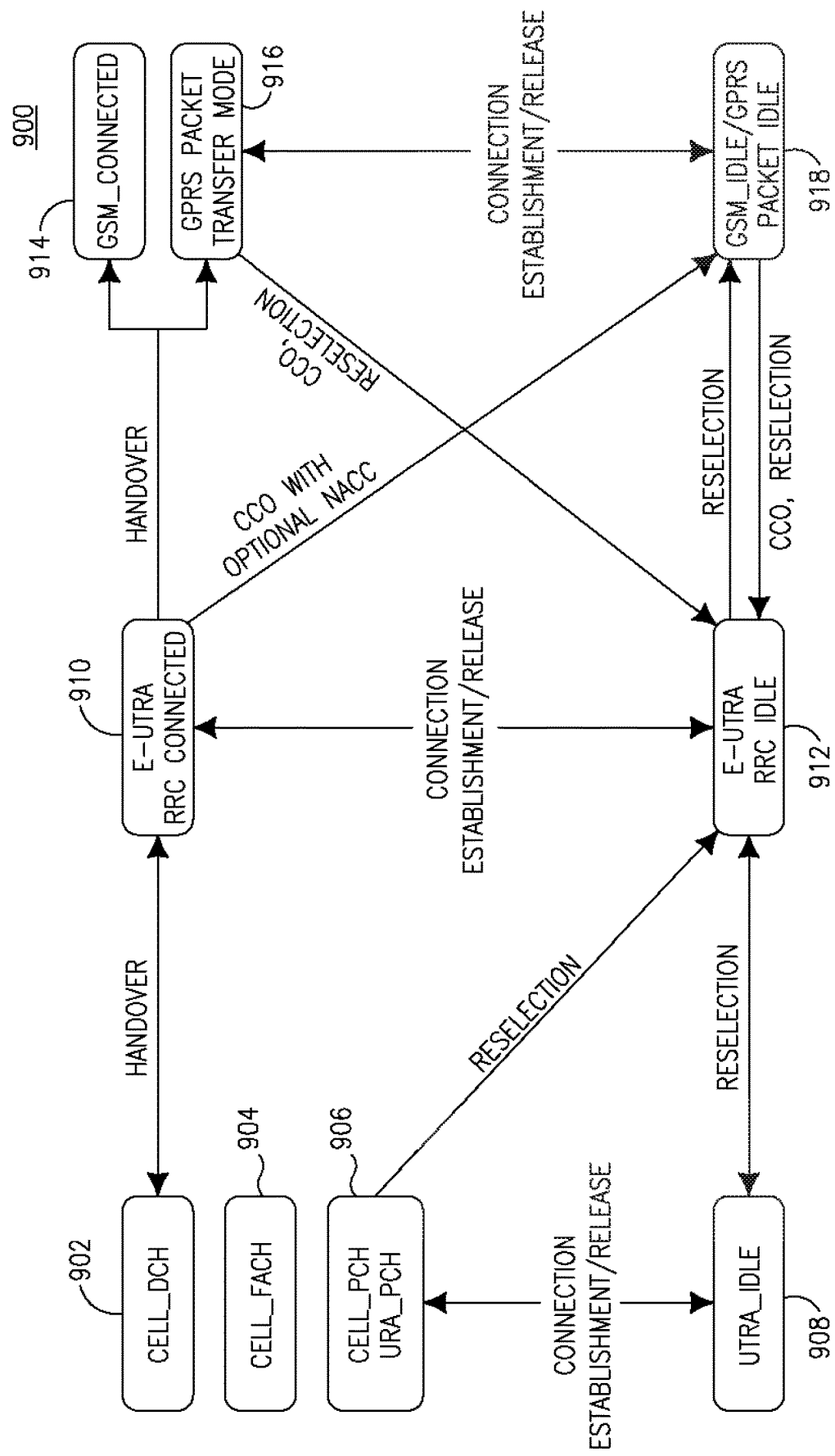
FIG. 9 is a block diagram illustrating the E-UTRA RRC states and mobility support between E-UTRAN, UTRAN and GERAN.

For each of the RRC protocols described in the above paragraph, a set of states, transitions, messages (e.g., protocol data units (PDUs)) and procedures are defined. FIG. 9 is a block diagram 900 illustrating the E-UTRA (e.g., LTE) RRC states including, for example, the CELL_DCH state 902, the CELL_FACH state 904, the CELL_PCH and URA_PCH states 906, the UTRA_IDLE state 908, the E-UTRA RRC CONNECTED state 910, the E-UTRA RRC IDLE state 912, the GSM Connected state 914, the GPRS packet transfer mode 916 and the GSM Idle/GPRS Packet Idle State 918. FIG. 9 also illustrates mobility support between E-UTRAN, UTRAN and GERAN.

In an embodiment, the single RRC instance 302 may manage the single RRC Connection 306, which may be used to handle radio resources management for all configured serving cells of any RAT. According to this embodiment, there may be at most one RRC instance and one RRC connection per WTRU at any time.

Figure 4:
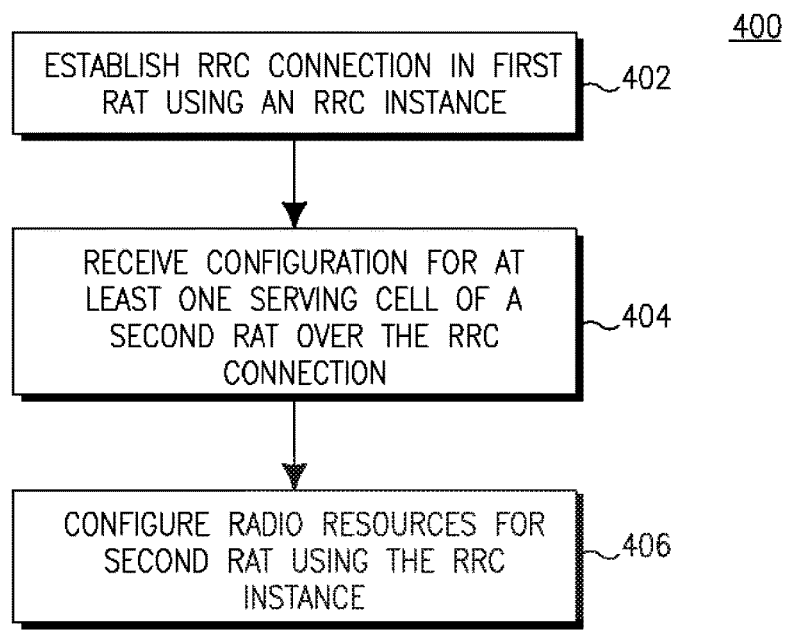
FIG. 4 is a flow diagram of an example method of performing wireless communication in a WTRU configured for multi-RAT operation corresponding to the embodiment illustrated in FIG. 3.

FIG. 4 is a flow diagram 400 of an example method of performing wireless communication in a WTRU configured for multi-RAT operation corresponding to the embodiment illustrated in FIG. 3. In the example illustrated in FIG. 4, a WTRU may first access a network and establish the RRC connection 306 in a first RAT (e.g., a primary RAT (PRAT)) using the RRC instance 302 (402). The WTRU may subsequently receive a configuration that adds at least one serving cell of a second RAT (e.g., a secondary RAT (SRAT) over the RRC connection 306 (404). The WTRU may then configure the radio resources using the single RRC instance 302 (406).

A primary cell (PCell) may include, for example, a cell operation on a primary frequency in which the WTRU performs the initial access to the system (e.g., the cell in which the WTRU performs the initial connection establishment procedure, the cell in which the WTRU initiates the connection re-establishment procedure, or the cell indicated as the primary cell in the handover procedure). The PCell may also correspond to a frequency indicated as part of the RRC configuration procedure. Some functions may be only supported on the PCell. For example, the UL CC of the PCell may correspond to the CC whose physical UL control channel resources are configured to carry all HARQ acknowledgement/non-acknowledgement (ACK/NACK) feedback for a given WTRU. For example, in LTE, the WTRU may use the PCell to derive the parameters for the security functions and for upper layer SI such as Non-Access Stratum (NAS) mobility information. Other functions that may be supported only on the PCell DL may include SI acquisition and change monitoring procedures on the broadcast channel (BCCH) and paging. For example, the PCell of WCDMA may be similar to the PCell of LTE. A secondary cell (SCell) may include, for example, a cell operating on a secondary frequency, which may be configured once an RRCconnection is established and may be used to provide additional radio resources. SI relevant for operation in the concerned SCell may be provided using dedicated signaling when the SCell is added to the WTRU's configuration. Although the parameters may have different values than those broadcast on the DL of the concerned SCell using the SI signaling, this information may be referred to as SI of the concerned SCell independently of the method used by the WTRU to acquire this information.

A primary RAT (PRAT) (or anchor RAT) may include the radio access network technology. At least one serving cell may be configured as the PCell for the PRAT. The PCell may support at least one of establishing a first RRC connection, deriving security parameters (e.g., in case a single security context is used), using UL resources to transmit UL control information (UCI) (e.g., if UCI is transmitted only on a serving cell of a first RAT), and/or configuring at least one serving cell with UL resources (e.g., if UL resources are configured only in a first RAT). Consequently, in some embodiments, the PRAT, or the anchor RAT, may also be referred to as the first RAT. A secondary RAT (SRAT) (or non-anchor RAT) may include the RAT for which none of the configured serving cell(s) is for the PRAT of the WTRU's configuration.

In an embodiment, a WTRU may access an LTE cell and establish an RRC connection 306 with LTE as the PRAT using the corresponding RRC connection establishment procedure. The WTRU may be configured using the RRC connection reconfiguration procedure of the PRAT with additional serving cells, which may include one or more HSPA serving cells as the SRAT. In an embodiment, the RRC connection reconfiguration procedure may be performed only once the security is activated in the PRAT. Further, in an embodiment, the WTRU may receive an RRC message including one or more IEs pertaining to the HSPA configuration (e.g., SI configuration IEs, radio bearer IEs, transport channel IEs and physical channel IEs) during the RRC reconfiguration procedure.

In another embodiment, a WTRU may access an HSPA cell and establish an RRC connection 306 with HSPA as the PRAT using the corresponding RRC connection establishment procedure. The WTRU may be configured using the RRC connection reconfiguration procedure of the PRAT with additional serving cells (e.g., one or more LTE serving cells) as the SRAT. In an embodiment, the WTRU may be configured using the RRC Radio bearer setup procedures of the PRAT to configure the PRAT specific information and simultaneously configured the WTRU with SRAT serving cells. Alternatively, the WTRU may be configured with the SRAT in the RRC Connection Setup using the signaling radio bearer (SRB) of the PRAT. In an embodiment, the RRC connection reconfiguration procedure may be performed only once the security is activated in the PRAT. Further, in an embodiment, the WTRU may receive an RRC message including one or more IEs pertaining to the LTE configuration (e.g., SI configuration IEs and/or RRC IEs, which may include at least one of a MAC-MainConfig IE, a CQI-ReportConfig IE, a PDSCH-Config IE, a Physical-ConfigDedicated IE, a RadioResourceConfigDedicated IE, and/or a RadioConfigCommon IE for the DL configuration of a serving cell and/or at least one of a PUSCH-Config IE and/or a SoundingRS-UL-Config IE for the UL configuration of the serving cell) during the RRC reconfiguration procedure.

SRBs are radio bearers used only for the transmission of RRC and NAS messages. SRB0 is used for RRC messages using the common control channel (CCH) logical channel. SRB1 is for RRC messages (e.g., with a piggybacked NAS message) and for NAS messages prior to establishment of SRB2 using the dedicated control channel (DCCH) logical channel. SRB2 is for NAS messages and is always configured after activation of security. Once security is activated, all RRC messages on SRB1 and SRB2 may be integrity protected and ciphered.

When CCs (or serving cells) of different RATs are aggregated and configured for a given WTRU, it may, thus, be necessary to have methods to handle the management of radio resource connections. In particular, if a plurality of RRC connections and/or state machines (SMs) may be used for multi-RAT access (e.g., one per RAT on which the WTRU operates), it may be desirable to define methods to ensure proper handling of each RRC connection and possible interactions in between. Alternatively, if a single RRC connection and/or state machine may be used for multi-RAT access, it may be desirable to define methods by which a single RRC state machine can control a plurality of radio resources.

Figure 5:
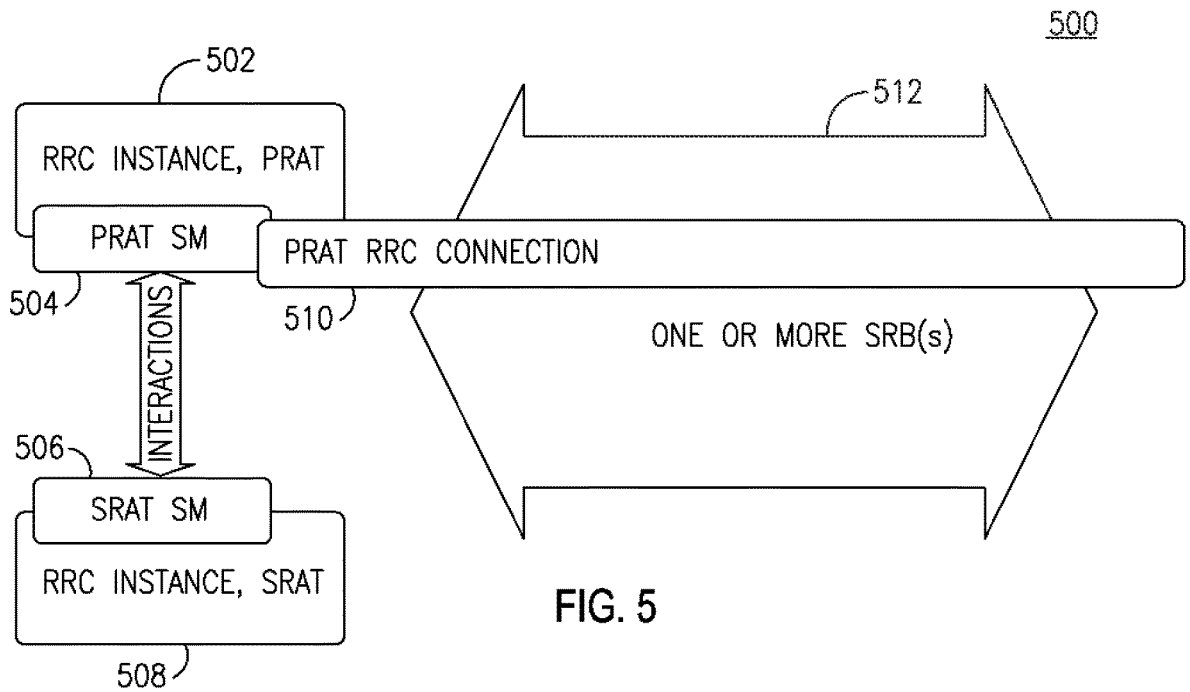
FIG. 5 is a block diagram of an example control plane for multi-RAT operation using an RRC instance for each configured RAT and a single RRC connection per WTRU.

FIG. 5 is a block diagram of an example control plane 500 for multi-RAT operation using an RRC instance for each configured RAT, a state machine for each RRC instance and a single RRC connection per WTRU. More specifically, the illustrated example includes an RRC instance 502 for a PRAT, a state machine 504 for the PRAT, an RRC instance 508 for an SRAT, a state machine 506 for the SRAT, a single RRC connection 510 and one or more SRB(s) 512. In the example illustrated in FIG. 5, radio resources for a plurality of RATs (e.g., the PRAT and the SRAT) may be managed using a plurality of RRC instances (e.g., a single instance of the control plane per configured RAT).

In an embodiment, the RRC instance 508 for the SRAT comprises a subset of the RRC protocol for the concerned RAT. For example, the RRC instance 508 for the SRAT may handle at least some radio resource management functions for the corresponding RAT (e.g., intra-frequency and inter-frequency measurement configuration and reporting, radio link monitoring (RLM), SI maintenance and error handling). In an embodiment, the RRC instance 508 for each SRAT may interact with the RRC instance 502 for the PRAT. In the illustrated embodiment, the RRC instance 502 manages the single RRC connection 510, which may be used to handle radio resources management of at least one RAT. There is also an additional RRC instance for each additional configured RAT (e.g., the RRC instance 508 for the SRAT), which may comprise a subset of the RRC protocol for the concerned RAT (SRAT).

For an LTE serving cell, a WTRU may perform RLM and determine UL radio link failure (RLF) when it reaches the maximum number of preamble transmissions for the random access procedure and/or repeated failure to perform the random access procedure on the concerned serving cell. Further, for an LTE serving cell, a WTRU may determine DL RLF when the RRC instance receives number N310 consecutive out-of-synch indications from the physical (PHY) layer and a timer T310 subsequently expires while the WTRU has not recovered from the error condition that started the timer.

Figure 6:
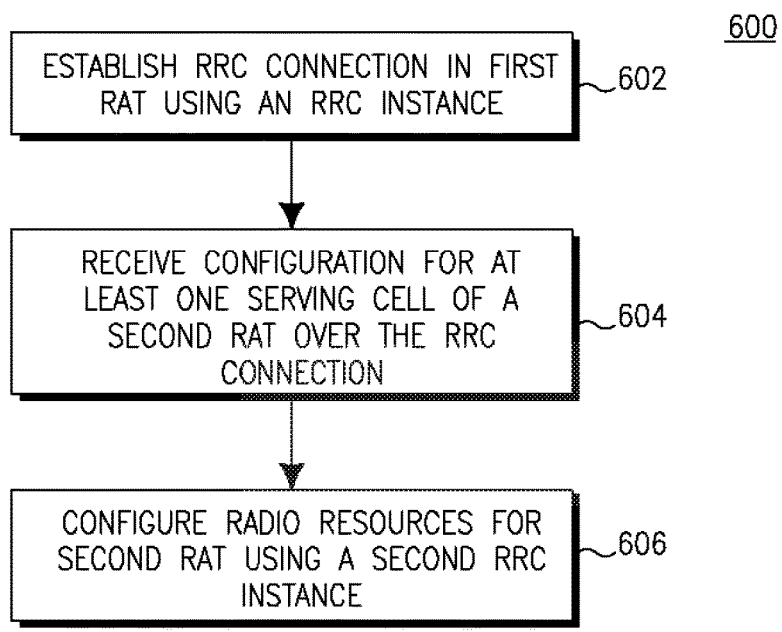
FIG. 6 is a flow diagram of an example method of performing wireless communication in a WTRU configured for multi-RAT operation corresponding to the embodiment illustrated in FIG. 5.

FIG. 6 is a flow diagram 600 of an example method of performing wireless communication in a WTRU configured for multi-RAT operation corresponding to the embodiment illustrated in FIG. 5. In the example illustrated in FIG. 6, a WTRU may first access a network and establish the RRC connection 510 in a first RAT (e.g., PRAT) using a first RRC instance (RRC instance 502 for the PRAT) (602). The WTRU may subsequently receive a configuration that adds at least one serving cell of a second RAT (e.g., the SRAT) over the RRC connection 510 (604). The WTRU may then use a second RRC instance (RRC instance 508 for the SRAT), which may configure the radio resources of the SRAT, using the RRC PDU(s) (e.g., received over different SRBs) and/or configuration information received over the RRC connection 510 (606). In an embodiment, the second RRC instance 508 may initially operate according to an RRC connected mode (e.g., LTE CONNECTED or HSPA CELL_DCH). The states of the RRC instance for an SRAT may not be active, or the RRC connected mode may be initiated by the PRAT.

For example, a WTRU may access an LTE cell and establish a RRC connection with LTE as the PRAT using the corresponding RRC connection establishment procedure. The WTRU may be configured with additional serving cells, for example, including one or more HSPA serving cells as the SRAT. In an embodiment, the configuration procedure may be performed only once the security is activated in the PRAT.

In an embodiment, the configuration may be received via the RRC connection reconfiguration procedure of the PRAT. In an embodiment, the WTRU may receive an RRC message including one or more IEs pertaining to the HSPA configuration, which may include, for example, at least one of SI configuration IEs, radio bearer IEs, transport channel IEs, physical channel IEs, and secondary serving HS-DSCH IEs during the RRC reconfiguration procedure. In an embodiment, the RRC instance of the PRAT may forward the received configuration information of the SRAT to the RRC instance of the corresponding SRAT, which may configure the corresponding radio resources of the SRAT.

In another embodiment, the configuration may be received over an SRB configured such that it is associated with the RRC instance 508 of the SRAT. In an embodiment, the WTRU may receive an RRC PDU of the RRC protocol of the SRAT over the SRB. In an embodiment, the RRC message may include one or more IEs pertaining to the HSPA configuration, which may include, for example, at least one of SI configuration IEs, radio bearer IEs, transport channel IEs, and physical channel IEs. In an embodiment, the RRC instance of the SRAT may perform the corresponding configuration procedures, such as a radio bearer control procedure and a physical channel configuration procedure.

For example, a WTRU may access an HSPA cell and establish an RRC connection with HSPA as the PRAT using the corresponding RRC connection establishment procedure. The WTRU may be configured with additional serving cells, which may include, for example, one or more LTE serving cells as the SRAT. In an embodiment, this configuration procedure may be performed only once the security is activated in the PRAT.

In an embodiment, the configuration may be received over the RRC connection reconfiguration procedure of the PRAT. In an embodiment, the WTRU may receive an RRC message including one or more IEs pertaining to the LTE configuration, which may include, for example, at least one of SI configuration IEs, RRC IEs (which may include at least one of a MAC-MainConfig IE, CQI-ReportConfig IE, PDSCH-Config IE, PhysicalConfigDedicated IE, RadioResourceConfigDedicated IE, and RadioConfigCommon IE for the DL configuration of a serving cell and may also include at least one of a PUSCH-Config IE and SoundingRS-UL-Config IE for the UL configuration of the serving cell). In an embodiment, the RRC instance 502 of the PRAT may forward the received configuration information of the SRAT to the RRC instance of the corresponding SRAT, which may configure the corresponding radio resources of the SRAT.

In another embodiment, the configuration may be received over an SRB configured such that it is associated with the RRC instance 508 of the SRAT. In an embodiment, the WTRU may receive an RRC PDU of the RRC protocol of the SRAT over the SRB. In an embodiment, the RRC message may include one or more IEs pertaining to the LTE configuration, which may include, for example, at least one of SI configuration IEs, radio resource control IEs (e.g., including at least one of a MAC-MainConfig IE, CQI-ReportConfig IE, PDSCH-Config IE, Physical ConfigDedicated IE, RadioResourceConfigDedicated IE, and a RadioConfigCommon IE for the DL configuration of a serving cell and at least one of a PUSCH-Config IE and a SoundingRS-UL-Config IE for the UL configuration of the serving cell). In an embodiment, the RRC instance of the SRAT may perform the corresponding RRC reconfiguration procedure(s), such as a radio resource configuration procedure.

Figure 7:
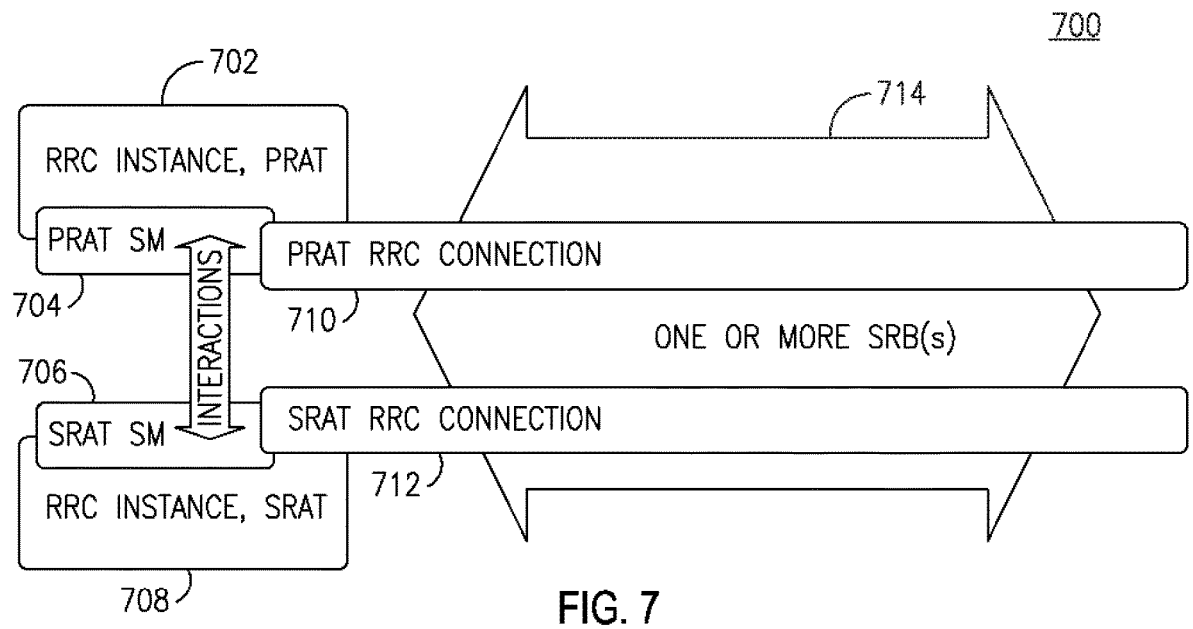
FIG. 7 is a block diagram of an example control plane for multi-RAT operation using an RRC instance and an RRC connection for each configured RAT.

FIG. 7 is a block diagram of an example control plane 700 for multi-RAT operation using an RRC instance for each configured RAT, a state machine for each RRC instance, and an RRC connection for each configured RAT. More specifically, the illustrated example includes an RRC instance 702 for a PRAT, a state machine 704 for the PRAT, an RRC instance 708 for an SRAT, a state machine 706 for the SRAT, an RRC connection 710 for the PRAT, an RRC connection 712 for the SRAT and one or more SRB(s) 714. In the example illustrated in FIG. 7, radio resources for a plurality of RATs (e.g., the PRAT and the SRAT) may be managed using a plurality of RRC instances (e.g., a single instance of the control plane per configured RAT).

Figure 8:
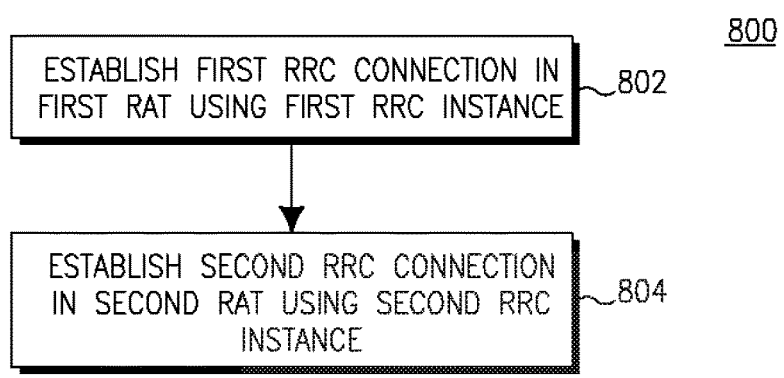
FIG. 8 is a flow diagram of an example method of performing wireless communication in a WTRU configured for multi-RAT operation corresponding to the embodiment illustrated in FIG. 7.

FIG. 8 is a flow diagram 800 of an example method of performing wireless communication in a WTRU configured for multi-RAT operation corresponding to the embodiment illustrated in FIG. 7. In the example illustrated in FIG. 8, a WTRU may establish the first RRC connection 710 in the first RAT (e.g., the PRAT) using the first RRC instance 702 (802). The WTRU may also establish the second RRC connection 712 in the second RAT (e.g., the SRAT) using the second RRC instance 708 (804).

In the embodiment illustrated in FIG. 7, each RRC instance 702 and 708 manages a single RRC connection 710 and 712 for its respective configured serving cell(s) of the concerned RAT.

In an embodiment, the RRC connections 710 and 712 may be established according to any number of different methods. In an embodiment, a WTRU may receive RRC signaling from the network on an existing RRC connection. The RRC signaling may include, for example, a request to establish an additional RRC connection to an SRAT, parameters to uniquely identify a concerned cell (e.g., a frequency (DL and UL), a cell identity, and SI). In another embodiment, the WTRU may receive an RRC reconfiguration message from the network on an existing RRC connection that adds at least one serving cell for an SRAT. The RRC reconfiguration message may include, for example, parameters to uniquely identify a concerned cell (e.g., a frequency (DL and UL), a cell identity, and SI). In another embodiment, when a packet data protocol (PDP) context is established for a new application, the WTRU may receive a request to establish an additional RRC connection to an SRAT. In another embodiment, a WTRU may autonomously initiate an access to a cell of a second RAT while it is already connected to a first RAT. This embodiment may be used, for example, where the WTRU supports multi-RAT access using two independent RRC instances.

The WTRU may autonomously initiate the access to the cell of the second RAT, for example, in response to receiving a paging message on a RAT while the WTRU is camping on a cell with an RRC instance in idle mode. Alternatively, a WTRU may autonomously initiate an access to a cell of a secondary RAT on a condition that it determines that an application is requesting service. For example, if the WTRU wants to initiate a CS call, and if it determines that it is a multi-RAT capable WTRU, it may initiate access to a cell in the secondary RAT and, in an embodiment, indicate the reason in the RRC connection establishment. In another embodiment, the WTRU may send a request to the network over the PRAT indicating that it may initiate the setup of the SRAT (e.g., following a WTRU specific trigger). The WTRU may send the request to the network, for example, in response to receiving a certain service request, and, in an embodiment, indicate a reason in the RRC message sent over the PRAT. In this embodiment, the WTRU may wait for an explicit setup message from the network to instantiate the SRAT RRC connection.

In an embodiment, there may be no interaction between the RRC instances 702 and 708. This may apply, for example, where a multi-mode WTRU operates as a multi-homed IP device (e.g., where each RAT may correspond to a different IP interface from a network connectivity perspective), which may be configured using NAS procedures. More specifically, the WTRU may be seen by the network as a single device implementing two different IP network interfaces, and, in an embodiment, each with its own PDP context (i.e., IP address), control/user data paths, and security context. RRM, mobility management, scheduling, and admission control for each RRC connection may be independent from each other.

In another embodiment, there may be additional interactions between the RRC instances 702 and 708. For example, an RRC message on a first RRC connection (e.g., 702) may initiate a procedure by the WTRU by which the WTRU may perform at least one of entering an idle mode state, performing the cell selection procedure to determine a suitable cell to camp on (or alternatively camp on a cell of a frequency indicated in the said RRC message), acquire the SI, monitor a paging channel, and perform an access to the SRAT. Alternatively, it may immediately perform an initial access to a cell, either selected by the WTRU using the cell selection procedure or, alternatively, to a cell of a frequency indicated in the RRC message.

In an embodiment, parameters may be exchanged or may be common to a plurality of RRC instances, including at least one of security parameters, NAS configuration (including PDP context), and user plane parameters (if a single data path is used). For example, from a network connectivity perspective, the WTRU may still be seen as a single device implementing a single IP network interface with a single PDP context (i.e., IP address), a single data path, and a single security context. The necessary parameter may be common to all RRC instances and obtained, for example, from the PRAT connection and/or the initial NAS configuration. In an embodiment, RRM and mobility management for each RRC connection may be configured independently from one another. Alternatively, mobility may be based on the PRAT connection (e.g., 710).

In an embodiment, the WTRU may be configured with zero or more SCells for the PRAT.

For the embodiments described with respect to FIGS. 5-8 wherein the control plane includes a separate RRC instance for each configured RAT for radio resource management, the different RRC instances may interact with one another using any one of a number of different methods, for example, for security configuration, security activation, security failure, failure handling, reconfiguration of an RRC connection, RLM, error recovery, state transition, transaction back to idle mode and action upon PUCCH/SRS release requests.

With respect to security configuration, activation and failure, the WTRU may use a second RRC instance when it adds a first serving cell for an SRAT. In an embodiment, on a condition that security is activated for another RRC instance, the WTRU may consider that security is already activated for the second RRC instance and apply the same configuration for integrity protection and ciphering for the access stratum, when applicable.

With respect to failure handling, the WTRU may receive control plane information (e.g., an RRC PDU or an IE) for the RRC instance of an SRAT, which it may fail to process. On a condition that the WTRU receives control plane information for the RRC instance of an SRAT that it fails to process, the WTRU may indicate to the network that the configuration failed, suspend any ongoing transmission on a serving cell of the concerned SRAT, invalidate the configuration for all servicing cells of the SRAT, remove the configuration for all serving cells of the SRAT, indicate to the network that the configuration failed and/or terminate the secondary RAT RRC instance or secondary RAT RRC connection. On a condition that the WTRU receives a configuration message that adds, modifies or removes at least part of a configuration for at least one serving cell of the SRAT, the WTRU may not successfully apply the concerned configuration. In this case, the WTRU may invalidate the configuration of the concerned serving cell, remove the configuration of the concerned serving cell, invalidate the configuration for all serving cells of the SRAT, remove the configuration for all serving cells of the SRAT, indicate to the network that the configuration failed and/or terminate the SRAT RRC instance or secondary RAT connection. Any of these failures may not impact the operation and/or configuration of the RRC connection for the PRAT.

With respect to reconfiguring an RRC connection, the WTRU may receive a radio resource reconfiguration message that adds a configuration for a first LTE serving cell with configured UL resources. The WTRU may subsequently initiate a procedure to gain UL timing synchronization (e.g., a random access procedure on the UL PRACH resources of the cell). In an embodiment, the WTRU may receive a handover command, which may include a configuration with at least one LTE serving cell with configured UL resources. In this embodiment, in addition to the initial access to the HSPA target cell, the WTRU may also initiate a procedure to gain UL timing synchronization (e.g., a random access procedure on the UL PRACH resources of the LTE target cell).

With respect to RLM, a WTRU may perform RLM for configured serving cells of an SRAT. In an embodiment, the WTRU may determine that it is experiencing RLF, for example, according to the criterion for RLF of a serving cell of the corresponding RAT. When a WTRU determines RLF (DL or UL) for a serving cell of a first RAT, the WTRU may remove the configuration for all serving cells of the first RAT, turn off the radio front end for the first RAT and/or indicate to the network of the RLF condition for the concerned serving cell. In an embodiment, the RRC instance of a first RAT may indicate the UL RLF condition to the RRC instance of a second RAT.

With respect to state transition and related procedures, a change of RRC state in a first RRC instance may trigger a change in state and/or a procedure in a second RRC instance. For example, a state transition in a first RRC instance may trigger a state transition in a second RRC instance, a release of the RRC connection in a second RRC instance, and/or the WTRU may turn off the radio front end for a second RAT corresponding to a second RRC instance. In an embodiment, an RRC state transition from CELL_DCH to any other state for an HSPA RRC instance may trigger an LTE RRC instance to perform a state transition to RRC IDLE, release the RRC LTE connection and/or turn off the LTE front end. For example, if HSPA is the PRAT, LTE may be the SRAT and UL resources may not be configured for the LTE RAT. In another embodiment, an RRC state transition to idle mode in a first RAT may trigger a state transition to the idle mode for the RRC instance of each configured SRAT or, alternatively, to release the RRC connection and/or turn off the front end of each configured SRAT, for example. If HSPA is the PRAT, LTE is the SRAT and only the HSPA RRC instance may perform the cell reselection procedure.

For another example, a state transition in a second RRC instance may not be allowed depending on the state of a first RRC instance. In an embodiment, an RRC state may not be allowed in an RRC instance for an SRAT based on the current state of another RRC instance. In particular, a WTRU may not transition to a CELL-FACH state or a CELL_PCH state for an HSPA RRC instance if an LTE RRC instance is in an RRC_CONNECTED state.

For another example, the operational state of a second RRC instance may follow the state of a first RRC instance. In an embodiment, the initial state of an RRC instance of an HSPA SRAT may be CELL_DCH when the state of the RRC instance of an LTE PRAT is RRC_CONNECTED.

With respect to transition back to idle mode, a transition to RRC idle for an RRC connection that is the PRAT of the WTRU may trigger either the release of other RRC connections and/or a move to RRC IDLE for another RRC instance (e.g., all RATs or only a RAT for which the WTRU should be in IDLE mode when not connected to the network). The RRC instance of the PRAT may notify another RRC instance for an SRAT of a change of state to IDLE. The RRC instance for the SRAT may then perform the procedure to move to IDLE mode, remove the dedicated configuration for the SRAT, revert to the default configuration and/or activate and/or turn off the transceiver module and/or some functionality of the SRAT.

With respect to action upon a PUCCH/SRS release request, the PRAT LTE RRC instance may receive an indication to release PUCCH/SRS dedicated resources from the lower layers (e.g., LTE MAC). This may occur, for example, upon reaching the maximum number of scheduling request (SR) transmissions on the configured PUCCH resource for SR or if the timing alignment timer (TAT) expires. When the TAT expires, the WTRU no longer has a valid timing advance and is no longer synchronized for UL transmissions. In this case, the RRC instance of the PRAT may indicate the loss of UL synchronization in the PRAT to the RRC instance of an SRAT.

For embodiments that use a single RRC connection for all configured RATs (e.g., embodiments described with respect to FIGS. 3, 4, 5 and 6 above), a WTRU may, for example, receive RRC messages and configuration parameters regarding the SRAT via SRAT IEs that are piggybacked inside RRC PDUs of the PRAT. In this embodiment, a WTRU may multiplex and/or demultiplex RAT-specific IEs inside the RRC PDU of the single RRC connection and identify the IE using an explicit identifier (e.g., an identity of the RRC state machine or SRAT) inside the RRC PDU.

In an embodiment, the RRC message of the PRAT may include an SRAT container IE. The SRAT container IE may include the information for the SRAT, which may be processed according to the RRC of the SRAT. For example, if the PRAT is LTE, then an HSPA SRAT may be established by including a utra-Secondarycell-Container IE. In an embodiment, the presence of this IE may trigger the initiation of the secondary RAT.

If more than one SRAT may be established, an SRAT type IE and an SRAT message container IE may be used. The SRAT message container IE may carry a message specified in another standard as indicated by the SRAT type IE. This container may carry the information and radio parameters required for the SRAT to be configured.

For example, a WTRU may be configured such that each group of cells configured for a given RAT is associated with an identity for that RAT. When the WTRU receives an RRC PDU, it may determine with what RAT an IE is associated and, for example, process the RRC PDU according to the applicable RAT. Similarly, the WTRU may transmit an RRC PDU including one or more information elements inside the RRC PDU. If, at most, two RATs are supported, this may be determined implicitly by the presence of the IE itself inside the PDU.

For embodiments that use a separate RRC instance for each configured RAT (e.g., embodiments described with respect to FIGS. 5, 6, 7 and 8 above), a WTRU may, for example, receive configuration parameters regarding the SRAT via multiplexing an RRC PDU for the PRAT and SRAT using different SRB identifiers (SRB IDs). In an embodiment, a WTRU may multiplex and/or demultiplex RRC PDUs over the data path and identify the RRC connection and/or state machine to which the RRC message is applicable based on the radio bearer identity used for the transmission of the RRC PDU.

For example, a WTRU may be configured such that one or more SRBs are associated with control signaling of a specific RAT, for example, based on SRB ID. When the WTRU receives an RRC PDU, it may determine what radio bearer the PDU is associated with and, for example, apply the proper security context for authentication (if any) and deciphering if the WTRU is configured with a RAT-specific security context and/or process the RRC PDU using the applicable RRC state machine for the associated RAT. Similarly, the WTRU may transmit an RRC PDU using the associated with the applicable RRC state machine.

In an embodiment, the SRBs applicable for an SRAT may be configured after security activation and being associated with a given priority. For example, the WTRU may be configured such that the SRBs applicable to, for example, a subset or a type of an HSPA RRC PDU have the same (or, alternatively, a lower) priority than SRB1 for the transport of the HSPA RRC PDUs over the LTE MAC. For example, the WTRU may be configured such that the logical channel(s) applicable to, for example, a subset or a type of LTE RRC PDU are mapped to a specific priority in the multiplexing functionality of MAC-ehs.

For embodiments that use a single RRC instance for all configured RATs (e.g., embodiments described with respect to FIGS. 3 and 4 above), radio resource management may be carried out using one of more of the examples described below on a condition that the WTRU receives a configuration that adds at least one serving cell for an SRAT. In such embodiments, a WTRU may have an established RRC connection (e.g. 306 in FIG. 3) with a PRAT.

In an embodiment, the WTRU may add a serving cell for an SRAT when security is activated (e.g., for the PRAT), in which case it may apply the same configuration for integrity protection and ciphering for the access stratum when applicable (e.g., when multiple data paths are used).

In an embodiment, a WTRU may receive an RRC message that adds, modifies or removes at least part of a configuration for at least one serving cell of the SRAT. The WTRU may not successfully apply the concerned configuration, in which case it may invalidate the configuration of the concerned serving cell, remove the configuration of the concerned serving cell, invalidate the configuration for all serving cells of the SRAT, remove the configuration for all serving cells of the SRAT, turn off the radio front end for the SRAT, indicate to the network that the configuration failed and/or terminate the SRAT RRC instance of the SRAT RRC connection. In particular, a failure to apply a configuration for an SRAT may not impact the operation and/or the configuration of the RRC connection for the PRAT. In case of a failure to successfully complete an RRC procedure applicable to an SRAT, the WTRU may abort the procedure and revert to the state before the WTRU initiated the procedure for the concerned SRAT.

When LTE is the PRAT, the RRC instance may perform radio resource management for an SRAT according to any of the following embodiments. In an embodiment, the WTRU operation for the PRAT may be according to typical procedures for the concerned RAT. In an embodiment, a WTRU may perform RLM for configured serving cells of an LTE PRAT, for example, for the PCell. The WTRU may determine, according to the criterion for RLF of a serving cell of the corresponding RAT, that it is experiencing UL RLF on the PCell of the LTE PRAT. The WTRU may perform an RRC state transition away from RRC_CONNECTED to RRC IDLE when it determines RLF (DL or UL) for a PCell of an LTE PRAT, in which case it may remove the configuration for all serving cells of an HSPA SRAT and/or turn off the radio front end for the HSPA SRAT.

The WTRU may also perform RLM for configured serving cells of an HSPA SRAT. The WTRU may determine, according to the criterion for RLF of a serving cell of the corresponding RAT, that it is experiencing UL RLF on the primary serving cell. On a condition that the WTRU determines UL RLF for a serving cell of an HSPA SRAT, the WTRU may invalidate the configuration of the concerned serving cell, remove the configuration of the concerned serving cell, invalidate the random access configuration of the concerned serving cell, remove the random access configuration of the concerned serving cell, invalidate the configuration for all serving cells of the HSPA SRAT, remove the configuration for all serving cells of the HSPA SRAT, turn off the radio front end for the HSPA SRAT, indicate to the network of the UL RLF condition for the concerned serving cell, consider the secondary RAT serving cells as deactivated and/or terminate the SRAT RRC instance of SRAT RRC connection.

In an embodiment, the WTRU may determine, according to the criterion for RLF of a serving cell of the corresponding RAT, that it is experiencing DL RLF. On a condition that the WTRU determines DL RLF for a serving cell of an HSPA SRAT, the WTRU may invalidate the configuration of the concerned serving cell, remove the configuration of the concerned serving cell, invalidate the configuration for all serving cells of the HSPA SRAT, remove the configuration for all serving cells of the HSPA SRAT turn off the radio front end for the HSPA SRAT and/or indicate to the network the DL RLF condition for the concerned serving cell.

A WTRU may perform an RRC state transition from LTE RRC_CONNECTED to LTE RRC IDLE, in which case the WTRU may invalidate the configuration for all serving cells of the SRAT, remove the configuration for all serving cells of the SRAT, turn off the radio front end for the SRAT and/or terminate the secondary RAT RRC instance or SRAT RRC connection.

The PRAT LTE RRC instance may receive an indication to release PUCCH/SRS dedicated resources from the lower layers (e.g., LTE MAC). This may occur, for example, upon reaching the maximum number of SR transmissions on the configured PUCCH resource for SR or if the TAT expires. When the TAT expires, the WTRU no longer has a valid timing advance and is no longer synchronized for UL transmissions. In this case, the WTRU may invalidate the configuration for all serving cells of the SRAT, remove the configuration for all serving cells of the SRAT, turn off the radio front end for the SRAT and/or terminate the SRAT RRC instance or SRAT RRC connection.

When HSPA is the PRAT, the RRC instance may perform radio resource management for an SRAT according to any of the following embodiments. In addition, the WTRU operation for the PRAT may be according to typical procedures for the concerned RAT.

In an embodiment, the WTRU may receive a radio resource reconfiguration message that adds a configuration for a first LTE serving cell with configured UL resources, and subsequently may initiate a procedure to gain UL timing synchronization (e.g., a random access procedure on the UL PRACH resources of the cell). In an embodiment, the WTRU may receive a handover command, which may include a configuration for at least one LTE serving cell with configured UL resources. The WTRU may, in addition to the initial access to the HSPA target cell, also initiate a procedure to gain UL timing synchronization (e.g., a random access procedure on the UL PRACH resources of the LTE target cell).

In an embodiment, the WTRU may perform RLM for one or more of the configured serving cells of a PRAT, in particular, for the primary serving cell of the HSPA PRAT. The WTRU may determine, according to, for example, the criterion for RLF of a serving cell of the corresponding RAT, that it is experiencing UL RLF on the primary serving cell. On a condition that it determines UL RLF for a primary serving cell of an HSPA PRAT, the RRC instance for the HSPA PRAT may receive a first out-of-synch indication from the physical layer and may refrain from performing UL transmissions. If at least one serving cell of the LTE SRAT is configured with UL resources and may transmit UL feedback information on the serving cell, then the WTRU may continue any transmission on the LTE SRAT.

The WTRU may perform an RRC state transition away from CELL_DCH (and/or to CELL_FACH) when it determines RLF (DL and/or UL) for a primary serving cell of an HSPA PRAT, in which case it may remove the configuration for all serving cells of the LTE SRAT, turn off the radio front end for the LTE SRAT and/or consider the LTE SRAT as deactivated by an order.

In an embodiment, the WTRU may perform RLM for configured serving cells of an LTE SRAT. The WTRU may determine, according to the criterion for RLF of a serving cell of the corresponding RAT, that it is experiencing UL RLF on a serving cell of an LTE SRAT, in particular the PCell. On a condition that it determines UL RLF for a serving cell of an LTE SRAT, the WTRU may invalidate the configuration of the concerned serving cell, remove the configuration of the concerned serving cell, invalidate the random access configuration of the concerned serving cell, remove the random access configuration of the concerned serving cell, invalidate the configuration for all serving cells of the LTE SRAT, remove the configuration for all serving cells of the LTE SRAT, turn off the radio front end for the LTE SRAT, indicate to the network the UL RLF condition for the concerned serving cell and/or terminate the SRAT RRC instance or SRAT RRC connection.

In an embodiment, the WTRU may determine, according to the criterion for RLF of a serving cell of the corresponding RAT, that it is experiencing DL RLF. On a condition that it determines DL RLF for a serving cell of an LTE SRAT, the WTRU may invalidate the configuration of the concerned serving cell, remove the configuration of the concerned serving cell, invalidate the configuration for all serving cells of the LTE SRAT, remove the configuration for all serving cells of the LTE SRAT, turn off the radio front for the LTE SRAT, indicate to the network the DL RLF condition for the concerned serving cell and/or terminate the SRAT RRC instance or SRAT RRC connection.

In an embodiment, the WTRU may perform an RRC state transition from a connected state (e.g., CELL_DCH, CELL_PCH or URA_PCH) to an idle mode, in which case the WTRU may invalidate the configuration for all serving cells of the LTE SRAT, remove the configuration for all serving cells of the LTE SRAT and/or turn off the radio front end for the LTE SRAT.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An eNodeB (eNB) of a first radio access technology (RAT) comprising:
a transceiver; and
a processor; wherein the transceiver and the processor are configured to:
communicate, with a wireless transmit/receive unit (WTRU), radio resource control (RRC) messages having a first RRC format of the first RAT using a first signaling radio bearer (SRB); and
transmit using the first SRB, to the WTRU, an RRC reconfiguration message including configuration information for a second RAT, wherein the configuration information for the second RAT includes information for configuring a second SRB for the second RAT.

2. The eNB of claim 1, wherein the communicated RRC messages having the first RRC format include an SRB identification (ID) associated with the first SRB.

3. The eNB of claim 1, wherein the transceiver and the processor are further configured to:
transmit, to the WTRU, a first RRC message including information for configuring a first medium access control (MAC) entity for the first RAT; and
transmit, to the WTRU, a second RRC message including information for configuring a second MAC entity for the second RAT, wherein first MAC entity and the second MAC entity are different.

4. The eNB of claim 1, wherein the transceiver and the processor are further configured to transmit, to the WTRU, a first RRC message including information for configuring the WTRU to establish a connection with a first primary cell of the first RAT.

5. The eNB of claim 4, wherein the transceiver and the processor are further configured to transmit, to the WTRU, a second RRC message including information for configuring the WTRU to communicate with a second primary cell of the second RAT.

6. The eNB of claim 1, wherein the first RAT is Long Term Evolution.

7. The eNB of claim 1, wherein the first RAT and the second RAT are different RATs.

8. A method performed by an eNodeB (eNB) of a first radio access technology (RAT), the method comprising:
communicating, with a wireless transmit/receive unit (WTRU), radio resource control (RRC) messages having a first RRC format of the first RAT using a first signaling radio bearer (SRB); and
transmitting using the first SRB, to the WTRU, an RRC reconfiguration message including configuration information for a second RAT, wherein the configuration information for the second RAT includes information for configuring a second SRB for the second RAT.

9. The method of claim 8, wherein the communicated RRC messages having the first RRC format include an SRB identification (ID) associated with the first SRB.

10. The method of claim 8, further comprising:
    transmitting, to the WTRU, a first RRC message including information for configuring a first medium access control (MAC) entity for the first RAT; and
    transmitting, to the WTRU, a second RRC message including information for configuring a second MAC entity for the second RAT, wherein first MAC entity and the second MAC entity are different.

11. The method of claim 8, further comprising transmitting, to the WTRU, a first RRC message including information for configuring the WTRU to establish a connection with a first primary cell of the first RAT.

12. The method of claim 11, further comprising transmitting, to the WTRU, a second RRC message including information for configuring the WTRU to communicate with a second primary cell of the second RAT.

13. The method of claim 8, wherein the first RAT is Long Term Evolution.

14. The method of claim 8, wherein the first RAT and the second RAT are different RATs.

\* \* \* \* \*